US007867084B2

(12) United States Patent
Martinek et al.

(10) Patent No.: US 7,867,084 B2
(45) Date of Patent: Jan. 11, 2011

(54) PASS-THROUGH LIVE VALIDATION DEVICE AND METHOD

(75) Inventors: Michael G. Martinek, Fort Collins, CO (US); Mark D. Jackson, Fort Collins, CO (US); Justin G. Downs, III, Fort Collins, CO (US)

(73) Assignee: IGT, Las Vegas, NV (US)

( * ) Notice: Subject to any disclaimer, the term of this patent is extended or adjusted under 35 U.S.C. 154(b) by 462 days.

(21) Appl. No.: 11/644,717

(22) Filed: Dec. 22, 2006

(65) Prior Publication Data

US 2007/0135216 A1 Jun. 14, 2007

Related U.S. Application Data

(62) Division of application No. 10/306,842, filed on Nov. 26, 2002, now Pat. No. 7,179,170.

(60) Provisional application No. 60/333,549, filed on Nov. 26, 2001.

(51) Int. Cl.
*G06F 17/00* (2006.01)

(52) U.S. Cl. ........................................................ 463/29

(58) Field of Classification Search ............. 463/16–25, 463/29, 42; 380/229, 232, 251; 713/161
See application file for complete search history.

(56) References Cited

U.S. PATENT DOCUMENTS

| | | | |
|---|---|---|---|
| 3,825,905 | A | 7/1974 | Allen, Jr. |
| 3,838,264 | A | 9/1974 | Maker |
| 4,072,930 | A | 2/1978 | Lucero et al. |
| 4,193,131 | A | 3/1980 | Lennon et al. |
| 4,200,770 | A | 4/1980 | Hellman et al. |
| 4,218,582 | A | 8/1980 | Hellman et al. |
| 4,354,251 | A | 10/1982 | Hellwig et al. |
| 4,355,390 | A | 10/1982 | Hellwig et al. |

(Continued)

FOREIGN PATENT DOCUMENTS

| | | |
|---|---|---|
| DE | 37 00 861 | 7/1988 |

(Continued)

OTHER PUBLICATIONS

Answer and Counterclaims to Second Amended Complaint filed in connection with Civil Action No. CV-S-01-1498, pp. 1-26 and certificate of service page.

(Continued)

*Primary Examiner*—Ronald Laneau
(74) *Attorney, Agent, or Firm*—Armstrong Teasdale LLP

(57) ABSTRACT

Hardware, systems, devices, architecture and methods for a wagering game-specific platform features secure storage and verification of game code and/or other data. An external connection securely communicates with a computerized wagering gaming system. Some embodiments of the invention provide the ability to identify game program code as certified or approved. This is provided by use of various electronic devices and elements for encryption, including at least a device that is internally embedded in the gaming device that access digital signatures, encrypted files, encrypted compiled files and hash functions as well as other encryption methods. Such functions are able to be effected, and security and validation is advantageously applied to data loaded into storage media even while the gaming machine is in operation.

27 Claims, 12 Drawing Sheets

U.S. PATENT DOCUMENTS 4,405,829 A 9/1983 Rivest et al.
4,458,315 A 7/1984 Uchenick
4,462,076 A 7/1984 Smith, III
4,467,424 A 8/1984 Hedges et al.
4,494,114 A 1/1985 Kaish et al.
4,519,077 A 5/1985 Amin
4,525,599 A 6/1985 Curran et al.
4,582,324 A 4/1986 Koza et al.
4,607,844 A 8/1986 Fullerton
4,652,998 A 3/1987 Koza et al.
4,658,093 A 4/1987 Hellman
4,727,544 A 2/1988 Brunner
4,752,068 A 6/1988 Endo
4,759,064 A 7/1988 Chaum
4,817,140 A 3/1989 Chandra et al.
4,837,728 A 6/1989 Barrie et al.
4,845,715 A 7/1989 Francisco
4,848,744 A 7/1989 Steininger et al.
4,856,787 A 8/1989 Itkis
4,865,321 A 9/1989 Nakagawa et al.
4,911,449 A 3/1990 Dickinson et al.
4,930,073 A 5/1990 Cina, Jr.
4,944,008 A 7/1990 Piosenka et al.
4,951,149 A 8/1990 Faroudja
5,004,232 A 4/1991 Wong et al.
5,021,772 A 6/1991 King et al.
5,050,212 A 9/1991 Dyson
5,103,081 A 4/1992 Fisher et al.
5,109,152 A 4/1992 Takagi et al.
5,146,575 A 9/1992 Nolan
5,155,680 A 10/1992 Wiedemer
5,155,768 A 10/1992 Matsuhara
5,155,856 A 10/1992 Bock et al.
5,161,193 A 11/1992 Lampson et al.
5,179,517 A 1/1993 Sarbin
5,224,160 A 6/1993 Paulini et al.
5,235,642 A 8/1993 Wobber et al.
5,259,613 A 11/1993 Marnell
5,283,734 A 2/1994 Yon Kohorn
5,288,978 A 2/1994 Iijima
5,291,585 A 3/1994 Sato et al.
5,297,205 A 3/1994 Audebert et al.
5,326,104 A 7/1994 Pease et al.
5,342,047 A 8/1994 Heidel et al.
5,343,527 A 8/1994 Moore
5,353,411 A 10/1994 Nakaosa et al.
5,375,241 A 12/1994 Walsh
5,394,547 A 2/1995 Correnti et al.
5,398,932 A 3/1995 Eberhardt et al.
5,421,006 A 5/1995 Jablon et al.
5,444,642 A 8/1995 Montgomery et al.
5,465,364 A 11/1995 Lathrop et al.
5,469,571 A 11/1995 Bunnell
5,473,765 A 12/1995 Gibbons et al.
5,488,702 A 1/1996 Byers et al.
5,489,095 A 2/1996 Goudard et al.
5,497,490 A 3/1996 Harada et al.
5,507,489 A 4/1996 Reibel et al.
5,553,290 A 9/1996 Calvert et al.
5,575,717 A 11/1996 Hourlet, Jr. et al.
5,586,766 A 12/1996 Forte et al.
5,586,937 A 12/1996 Menashe
5,594,903 A 1/1997 Bunnell et al.
5,604,801 A 2/1997 Dolan et al.
5,611,730 A 3/1997 Weiss
5,634,058 A 5/1997 Allen et al.
5,643,086 A 7/1997 Alcorn et al.
5,644,704 A 7/1997 Pease et al.
5,655,965 A 8/1997 Takemoto et al.
5,664,187 A 9/1997 Burkes et al.
5,668,945 A 9/1997 Ohba et al.
5,671,351 A 9/1997 Wild et al.
5,702,303 A 12/1997 Takemoto et al.
5,704,835 A 1/1998 Dietz, II
5,707,286 A 1/1998 Carlson
5,725,428 A 3/1998 Achmuller
5,737,418 A 4/1998 Saffari et al.
5,742,616 A 4/1998 Torreiter et al.
5,752,882 A 5/1998 Acres et al.
5,758,875 A 6/1998 Giacalone, Jr.
5,759,102 A 6/1998 Pease et al.
5,768,382 A 6/1998 Schneier et al.
5,778,226 A 7/1998 Adams et al.
5,800,268 A 9/1998 Molnick
5,809,329 A 9/1998 Lichtman et al.
5,823,874 A 10/1998 Adams
5,848,250 A 12/1998 Smith et al.
5,848,932 A 12/1998 Adams
5,863,041 A 1/1999 Boylan et al.
5,870,587 A 2/1999 Danforth et al.
5,871,398 A 2/1999 Schneier et al.
5,871,400 A 2/1999 Yfantis
5,872,973 A 2/1999 Mitchell et al.
5,879,234 A 3/1999 Mengual
5,889,990 A 3/1999 Coleman et al.
5,893,121 A 4/1999 Ebrahim et al.
5,901,319 A 5/1999 Hirst
5,934,672 A 8/1999 Sines et al.
5,935,224 A 8/1999 Svancarek et al.
5,944,821 A 8/1999 Angelo
5,954,583 A 9/1999 Green
5,970,143 A 10/1999 Schneier et al.
5,971,851 A 10/1999 Pascal
5,984,786 A 11/1999 Ehrman
5,991,399 A 11/1999 Graunke et al.
5,991,546 A 11/1999 Chan et al.
5,995,745 A 11/1999 Yodaiken
5,999,990 A 12/1999 Sharrit et al.
6,003,038 A 12/1999 Chen
6,006,279 A 12/1999 Hayes
6,015,344 A 1/2000 Kelly et al.
6,021,414 A 2/2000 Fuller
6,026,238 A 2/2000 Bond et al.
6,035,321 A 3/2000 Mays
6,044,428 A 3/2000 Rayabhari
6,044,471 A 3/2000 Colvin
6,071,190 A 6/2000 Weiss et al.
6,075,939 A 6/2000 Bunnell et al.
6,099,408 A 8/2000 Schneier et al.
6,102,796 A 8/2000 Pajitnov et al.
6,104,815 A 8/2000 Alcorn et al.
6,104,859 A 8/2000 Yoshida et al.
6,106,396 A 8/2000 Alcorn et al.
6,126,548 A 10/2000 Jacobs et al.
6,134,677 A 10/2000 Lindsay
6,135,884 A 10/2000 Hedrick et al.
6,149,522 A 11/2000 Alcorn et al.
6,165,072 A 12/2000 Davis et al.
6,181,336 B1 1/2001 Chiu et al.
6,185,678 B1 2/2001 Arbaugh et al.
6,195,587 B1 2/2001 Hruska et al.
6,203,427 B1 3/2001 Walker et al.
6,210,274 B1 4/2001 Carlson
6,214,495 B1 4/2001 Segawa et al.
6,215,495 B1 4/2001 Grantham et al.
6,222,529 B1 4/2001 Ouatu-Lascar et al.
6,224,482 B1 5/2001 Bennett
6,251,014 B1 6/2001 Stockdale et al.
6,263,392 B1 7/2001 McCauley
6,264,557 B1 7/2001 Schneier et al.
6,269,474 B1 7/2001 Price
6,279,124 B1 8/2001 Brouwer et al.
6,319,125 B1 11/2001 Acres
6,327,605 B2 12/2001 Arakawa et al.

| | | | | |
|---|---|---|---|---|
| 6,364,769 | B1 | 4/2002 | Weiss et al. | |
| 6,368,219 | B1 | 4/2002 | Szrek et al. | |
| 6,394,907 | B1 | 5/2002 | Rowe | |
| 6,401,208 | B2 | 6/2002 | Davis et al. | |
| 6,409,602 | B1 | 6/2002 | Wiltshire et al. | |
| 6,446,211 | B1 | 9/2002 | Colvin | |
| 6,460,142 | B1 | 10/2002 | Colvin | |
| 6,484,164 | B1 | 11/2002 | Nikolovska et al. | |
| 6,496,808 | B1 | 12/2002 | Aiello et al. | |
| 6,502,195 | B1 | 12/2002 | Colvin | |
| 6,510,521 | B1 | 1/2003 | Albrecht et al. | |
| 6,257,638 | B1 | 4/2003 | Walker et al. | |
| 6,577,733 | B1 | 6/2003 | Charrin | |
| 6,595,856 | B1 | 7/2003 | Ginsburg et al. | |
| 6,620,047 | B1 | 9/2003 | Alcorn et al. | |
| 6,671,745 | B1 | 12/2003 | Mathur et al. | |
| 6,772,234 | B1 * | 8/2004 | O'Hare et al. | 710/17 |
| 6,785,825 | B2 | 8/2004 | Colvin | |
| 6,792,548 | B2 | 9/2004 | Colvin | |
| 6,792,549 | B2 | 9/2004 | Colvin | |
| 6,795,928 | B2 | 9/2004 | Bradley et al. | |
| 6,799,277 | B2 | 9/2004 | Colvin | |
| 6,813,717 | B2 | 11/2004 | Colvin | |
| 6,813,718 | B2 | 11/2004 | Colvin | |
| 6,851,607 | B2 | 2/2005 | Orus et al. | |
| 6,857,078 | B2 | 2/2005 | Colvin et al. | |
| 6,935,946 | B2 | 8/2005 | Yoseloff | |
| 6,978,465 | B2 | 12/2005 | Williams | |
| 7,043,641 | B1 | 5/2006 | Martinek et al. | |
| 7,063,615 | B2 | 6/2006 | Alcorn et al. | |
| 7,179,170 | B2 | 2/2007 | Martinek et al. | |
| 7,470,182 | B2 * | 12/2008 | Martinek et al. | 463/16 |
| 7,491,122 | B2 * | 2/2009 | Ryan | 463/29 |
| 7,515,718 | B2 * | 4/2009 | Nguyen et al. | 380/278 |
| 7,520,811 | B2 * | 4/2009 | LeMay et al. | 463/29 |
| 2001/0003709 | A1 | 6/2001 | Adams | |
| 2001/0037438 | A1 | 11/2001 | Mathis | |
| 2001/0044339 | A1 | 11/2001 | Cordero | |
| 2002/0049909 | A1 | 4/2002 | Jackson et al. | |
| 2002/0151363 | A1 | 10/2002 | Letovsky et al. | |
| 2003/0014639 | A1 | 1/2003 | Jackson et al. | |
| 2003/0130032 | A1 | 7/2003 | Martinek et al. | |
| 2003/0195033 | A1 | 10/2003 | Gazdic et al. | |
| 2003/0203755 | A1 | 10/2003 | Jackson | |
| 2003/0203756 | A1 | 10/2003 | Jackson | |

FOREIGN PATENT DOCUMENTS

| | | | |
|---|---|---|---|
| DE | 40 14 477 | | 7/1991 |
| EP | 0 685 246 | A1 | 12/1995 |
| GB | 2 072 395 | | 9/1981 |
| GB | 2 202 984 | | 9/1981 |
| GB | 2 121 569 | | 12/1983 |
| GB | 2 201 821 | | 9/1988 |
| WO | WO 99/65579 | | 12/1999 |
| WO | WO 00/33196 | | 6/2000 |
| WO | 0150230 | | 7/2001 |

OTHER PUBLICATIONS

Defendants', Supplemental Response to Plaintiffs' First Set of Interrogatories filed in connection with Civil Action No. CV-S-01-1498, pp. 1-3, 50-68 and 85-86.
Davida, G. et al., "Defending Systems Against Viruses through Cryptographic Authentication," Proceedings of the Symposium on Security and Privacy, *IEEE Comp. Soc. Press*, pp. 312-318 (May 1, 1989).
Document entitled "Fact Sheet on Digital Signature Standard" dated May 1994, 6 pages.
Federal Information Processing Standards (FIPS) Publication 180-1 entitled "Secure Hash Standard" dated Apr. 17, 1995, 2 title pages, abstract page and pp. 1-21.
Federal Information Processing Standards (FIPS) Publication 180 entitled "Secure Hash Standard" dated May 11, 1993, title page, abstract page and pp. 1-20.
Federal Information Processing Standards (FIPS) Publication 186 entitled "Digital Signature (DSS)" dated Jan. 27, 2000, 17 pages.
Hellman, Martin E., "The Mathematics Public-Key Cryptography," Scientific American, vol. 241, No. 8, Aug. 1979, pp. 146-152 and 154-157.
Rivest, et al., "A Method for Obtaining Digital Signatures and Public-Key Cryptosystems," Communications of the ACM, vol. 21, No. 2, Feb. 1978, pp. 120-126.
Bauspiess, et al., "Requirements for Cryptographic Hash Functions," *Computers and Security*, 5:427-437 (Sep. 11, 1992).
Complaint for patent infringement filed by Aristocrat Technologies, et al., dated Jan. 22, 2002, Civil Action No. CV-S-02-0091.
Bakhtiari et al., Cryptographic Hash Functions: A Survey, 1995, Centre for Computer Security Research, pp. 1-26.
Schneier B,: "Applied Cryptography, Second Edition. Protocols, Algorithms, and Source Code in C" 1996, John Wiley & Sons, Inc. USA, XP002344241, pp. 446-449; pp. 458-459.
Menezes A., Van Oorschot P., Vanstone S.: "Handbook of Applied Cryptography" 1996, CRC Press, USA, XP002344242, pp. 365-366.
European Search Report dated Sep. 28, 2005, from corresponding EP Application No. 01918440.7 (3 pages).
Australian Office Action dated Dec. 12, 2005, from corresponding Australian Application No. 2001245518 (2 pages).
David A. Rusling, "The Linux Kernel," http://tldp.org/LDP/tlk/tlk-title.html, copyright 1996-1999, downloaded Feb. 21, 2006.
"Linux Kernel Glossary," entry for ZFOD (zero-fill-on-demand), http://www.kernelnewbies.org/glossary, downloaded Feb. 22, 2006.
International Search Reports for applications PCT/US01/07447, PCT/US01/07381 and PCT/US02/30286.
Retro Fitting a Low-Boy Arcade Machine with a Pentium-Powered M.A.M.E. Setup, Oct. 1996, www.Cygnus.uwa.edu.au/~jaycole/jaw/arcade/html (5 pages).
Object-Oriented Programming Concepts, Sun Microsystems, Inc. (2002) (16 pages).
Terry Monlick, What is Object-Oriented Software, Software Design Consultants, LLC (1999), (5 pages).
OnCore sytems, http://www.oncoresystems.com (1999) (8 pages).
Encyclopedia, http://www.eetnetwork.com/encyclopedia, (2002) (7 pages).
Michael Tiemann, "Why Embedded Linux" http://linuxdevices.com/articles/AT8926600504.html (Oct. 28, 1999) (6 pages).
Rick Lehrbaum, "Why Linux" http://linuxdevices.com/articles/AT9663974466.html (Jan. 31, 2000), pp. 1-2.
Rick Lehrbaum, "Why Linux" http://linuxdevices.com/articles/AT3611822672.html (Feb. 19, 2000), pp. 1-5.
RTD USA, www.rtdusa.com, 1998, pp. 1-49.
Mardsen et al., "Development of a PC-Windows Based Universal Control System", $5^{th}$ Intl. Conf. On Factory 2000, Apr. 2-4, 1997, Conf. Pub. N. 435, pp. 284-287.
Paul Virgo, "Embedded PC's for the Industrial Marketplace: An Analysis of the STD Bus", WESCON 1993, Conference Record, Sep. 28-30, 1993, pp. 621-623.
Jahn Luke et al., "A Commercial Off-The-Shelf Based Replacement Strategy for Aging Avionics Computers", Aerospace and Electronics Conference 1998. NAECON 1998, Proceedings of the IEEE 1998 National, Jul. 13-17, 1998, pp. 177-181.
Get Control, Inc., PC-104 DEG-10-48 Plus, http://www.getcontrol.com, Mar. 20, 2003, 1 page.
D. Powerll et al., GUARDS: A Generic Upgradeable Architecture for Real-Tie Dependable Systems, Parallel and Distributed Systems, IEEE Transactions, vol. 10, Issue 6, Jun. 1999, pp. 580-599.
Robert A. Burkle, "PC/104 Embedded Modules: The New Systems Components", http://www.winsystms.com/papers/sys_components.pdf, Mar. 20, 2003, pp. 1-3.
WinSystems, www.winsystems.com, Apr. 2, 2003, pp. 1-25.
Jim Blazer, "PC/104 Intelligent Data Acquisition, PC/104 Embedded Solutions", 1998, pp. 1-2.
Robert A Burkle, "STD Bus: Performance Without Complexity", gttp://www.winsystems.com/papers/stdperformance.pdf, Aug. 1, 2001, pp. 1-3.
Craig Matasumoto, "Intel Starts Preaching About Security", EE Times, http://eetimes.com/story/OEG19990121S0014, Jan. 21, 1999, pp. 1-4.

Australian Search Report dated Dec. 18, 2006 from corresponding International Application No. 2002362027.
Notification of Transmittal of the International Search Report dated Mar. 31, 2003 from PCT Application No. PCT/US02/38054.
Written Opinion dated Oct. 2, 2003 from PCT Application No. PCT/US02/38054.
AU Office Action dated Feb. 28, 2008 from Application No. 2007207859.
AU Office Action dated Mar. 12, 2009 from Application No. 2007207859.

* cited by examiner

PASS-THROUGH LIVE VALIDATION DEVICE AND METHOD

CROSS REFERENCE TO RELATED APPLICATION

This application is a divisional of U.S. patent application Ser. No. 10/306,842, titled "PASS-THROUGH LIVE VALIDATION DEVICE AND METHOD" filed Nov. 26, 2002 and now issued as U.S. Pat. No. 7,179,170 on Feb. 20, 2007, which claims priority to Provisional U.S. patent application Ser. No. 60/333,548, filed 26 Nov. 2001, titled "PASS-THROUGH LIVE VALIDATION DEVICE", now expired, both of which are incorporated herein by reference.

BACKGROUND OF THE INVENTION

1. Field of the Invention

The present invention relates generally to computerized wagering game systems, and more specifically to use of a physical system for embedding a data verification device, component or a verification subcomponent in a gaming apparatus. The verification device effects required validation and security functions through encryption, code analysis, data analysis and/or hash functions in a computerized wagering game system.

2. Background of the Art

Games of chance have been enjoyed by people for thousands of years and have enjoyed increased and widespread popularity in recent times. As with most forms of entertainment, players enjoy playing a wide variety of games and new games. Playing new games adds to the excitement of "gaming." As is well known in the art and as used herein, the term "gaming" and "gaming devices" are used to indicate that some form of wagering is involved, and that players must make wagers of value, whether actual currency or some equivalent of value, e.g., token or credit. One popular gaming device is the slot machine. Conventionally, a slot machine is configured for a player to wager something of value, e.g., currency, house token, established credit, debit on existing credit or other representation of currency or credit. After the wager has been made, the player activates the slot machine to cause a random event to occur. The player wagers that particular random events will occur that will return value to the player. A standard gaming device causes a plurality of reels to spin and ultimately stop, displaying a randomly selected combination of some form of indicia, for example, numbers or symbols. If this display contains one of a preselected plurality of winning combinations, the machine releases money into a payout chute or increments a credit meter or stored credit record by the amount won by the player. For example, if a player initially wagers two coins of a specific denomination and that player achieved a payout, that player may receive the same number or multiples of the wagered amount in coins or credit of the same denomination as wagered.

There are many different formats for generating the random display of events that can occur to determine payouts in wagering devices. The standard or original format was the use of three reels with symbols distributed over the face of the reel. When the three reels were spun, they would eventually each stop in turn, displaying a combination of three symbols (e.g., with three reels and the use of a single payout line as a row in the middle of the area where the symbols are displayed.) By appropriately distributing and varying the symbols on each of the reels, the random occurrence of predetermined winning combinations can be provided in mathematically predetermined probabilities. By clearly providing for specific probabilities for each of the preselected winning outcomes, precise odds that control the amount of the payout for any particular combination and the percentage return on wagers for the house can be readily controlled.

Other formats of gaming apparatus that have developed in a progression from the standard slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video games therefore were simulated slot machines. The use of video gaming apparatus to play new games such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct pay lines, including randomly placed lines, scatter pays, or single image payouts. Video gaming systems may also enable the play of multiple games at separate times or at the same time (e.g., 100 video poker games) on the same gaming device.

In addition to the variation in formats for the play of games, bonus plays, bonus awards, and progressive jackpots have been introduced with great success. The bonuses may be associated with the play of games that are quite distinct from the play of the original game. Examples include a video display of a horse race with bets on the individual horses randomly assigned to players that qualify for a bonus, the spinning of a random wheel with fixed amounts of a bonus payout on the wheel (or simulation thereof), and the selection of symbols or objects having random multipliers or values assigned to them that are displayed only after selection of the symbols or objects or attempting to select a random card that is of higher value than a card exposed on behalf of a virtual dealer.

Examples of such gaming apparatus with a distinct bonus feature includes U.S. Pat. Nos. 5,823,874; 5,848,932; 5,836,041; U.K. Patent Nos. 2 201 821 A; 2 202 984 A; and 2 072 395A; and German Patent DE 40 14 477 A1. Each of these patents differs in fairly subtle ways as to the manner in which the bonus round is played. British Patent 2 201 821 A and German Patent DE 37 00 861 A1 describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment.

U.S. Pat. No. 6,264,557 describes a system for playing electronic games that includes a game server and one or more player terminals. Game results are based on a random number generated in each of the game server and the player terminals. The game server and the player terminals cooperate to ensure that the random numbers are generated independently. As a result, game players and the game host, such as a casino, can be confident that play results are not fraudulent. In one embodiment, the random numbers are transmitted between the game server and the player terminals at substantially the same time. In other embodiments, the random numbers are encoded and exchanged between the game server and the player terminals. Then, keys to decode the random numbers are exchanged.

U.S. Pat. No. 6,203,427 describes a system for facilitating an Internet-based game of chance, particularly a computer-based version of a punchboard game having a grid with prizes associated with the various grid locations. The user can pay a central controller for each selection by providing a credit card number, or through other Internet transaction means. The central controller sends the user a fresh virtual punchboard (i.e. a game in which no selections have yet been made). The user selects a grid location, encrypts it, and then transmits it to the central controller. The central controller then generates prize values for the grid that it sent to the player. The user's computer stores the locations of each prize and determines whether the player's selection was a winner. If he has won, the player sends the decryption key to the central controller to decrypt his grid selection and authenticate his selection. The central controller then initiates a payment to the user.

U.S. Pat. No. 6,149,522 describes authentication of a casino game data set that is carried out within the casino game console using an authentication program stored in an unalterable ROM physically located within the casino game console. The casino game data set and a unique signature are stored in a mass storage device, which may comprise a read only unit or a read/write unit and which may be physically located either within the casino game console or remotely located and linked to the casino game console over a suitable network. The authentication program stored in the unalterable ROM performs an authentication check on the casino game data set at appropriate times, such as prior to commencement of game play, at periodic intervals or upon demand. At appropriate occasions, the contents of the unalterable ROM can be verified by computing the message digest of the unalterable ROM contents and comparing this computed message digest with a securely stored copy of the message digest computed from the ROM contents prior to installation in the casino game console.

The invention described in U.S. Pat. No. 6,106,396 is an electronic casino gaming system which greatly expands casino game play capability and enhances security and authentication capabilities. More particularly, the invention comprises an electronic casino gaming system and method having greatly expanded mass storage capability for storing a multiplicity of high resolution, high sound quality casino type games, and provides enhanced authentication of the stored game program information with a high security factor. According to a first aspect of the invention, authentication of a casino game data set is carried out within the casino game console using an authentication program stored in an unalterable ROM physically located within the casino game console. The casino game data set and a unique signature are stored in a mass storage device, which may comprise a read only unit or a read/write unit and which may be physically located either within the casino game console or remotely located and linked to the casino game console over a suitable network. The authentication program stored in the unalterable ROM performs an authentication check on the casino game data set at appropriate times, such as prior to commencement of game play, at periodic intervals or upon demand. At appropriate occasions, the contents of the unalterable ROM can be verified by computing the message digest of the unalterable ROM contents and comparing this computed message digest with a securely stored copy of the message digest computed from the ROM contents prior to installation in the casino game console.

U.S. Pat. No. 6,099,408 describes an electronic game system comprising a game server and one or more player terminals, wherein said one or more player terminals include: a first random number generator; and first transmitting means for transmitting said first random number to said game server at substantially the same time as a second random number is received; and wherein said game server includes: a second random number generator; and second transmitting means for transmitting said second random number to said one or more player terminals at substantially the same time as said first random number is received, said system including means for generating a game result based on said first random number and said second random number.

U.S. Pat. No. 5,643,086 describes an electronic casino gaming system including an unalterable ROM for storing a casino game authentication program, including a message digest algorithm program, a decryption program and a decryption key. A casino game data set containing casino game rules and image data is stored in a mass storage device, such as a local disk memory or a remote network file server, along with the signature of the casino game data set. The signature is an encrypted version of the message digest of the casino game data set, prepared using a hash function. Prior to permitting game play by a player, the casino game data set is transferred from the mass storage device to main memory and during this process the message digest is computed from the image data using a hash function stored in the ROM. The encrypted version of the message digest transferred from the mass storage device is decrypted using the decryption program and decryption key stored in the unalterable ROM. The two message digests are then compared for a match: if a match exists, game play is permitted; if a match does not exist, game play is prohibited. The authentication procedure is also used to check all casino game software, both programs and fixed data sets, stored in any memory devices distributed throughout the system, such as the system boot ROM, NVRAM and all sub-system memory devices. The authentication procedure is run whenever a particular program or fixed data set is scheduled for use by the system, and also at periodic intervals and on demand.

U.S. Pat. Nos. 5,823,874 and 5,848,932 describe a gaming device comprising: a first, standard gaming unit for displaying a randomly selected combination of indicia, said displayed indicia selected from the group consisting of reels, indicia of reels, indicia of playing cards, and combinations thereof; means for generating at least one signal corresponding to at least one select display of indicia by said first, standard gaming unit; means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal. In effect, the second gaming event simulates a mechanical bonus indicator such as a roulette wheel or wheel with a pointing element.

A video terminal is another form of gaming device. Video terminals operate in the same manner as conventional slot or video machines except that an electronic credit or a redemption ticket is issued rather than an immediate payout being dispensed.

The vast array of electronic video gaming apparatus that is commercially available is not standardized within the industry or necessarily even within the commercial line of apparatus available from a single manufacturer. One of the reasons for this lack of uniformity or standardization is the fact that many of the operating systems that have been used to date in the industry are primitive. As a result, the programmer must often create code for each and every function performed by each individual apparatus. To date, no manufacturer is known to have been successful in creating a universal operating system for converting existing equipment (that includes features such as reusable modules of code) at least in part because of the limitations in utility and compatibility of the operating systems in use. When new games are created, new hardware and software is typically created from the ground up.

At least one attempt has been made to create a universal gaming engine that segregates the code associated with random number generation and algorithms applied to the random number string from the balance of the code. Carlson U.S. Pat. No. 5,707,286 describes such a device. This patentee recognized that modular code would be beneficial, but only contemplated making random number generation and transfer algorithms modular.

Devices for authentication of data are used in gaming machines at the present time. For example, Aurora Casino Equipment uses a bridge that is inserted between a single EPROM chip and the game machine. This bridge has a communication function that apparently broadcasts a signature to an RF receiver to verify hard memory on the EPROM chip. Each EPROM would require a separate broadcasting bridge to authenticate each EPROM. The published system also appears to authenticate data on an EPROM upon boot up.

The lack of a standard operating system has contributed to maintaining an artificially high price for the systems in the market. The use of unique hardware interfaces in the various manufactured video gaming systems is a contributing factor. The different hardware, the different access codes, the different pin couplings, the different harnesses for coupling of pins, the different functions provided from the various pins, and the other various and different configurations within the systems has prevented any standard from developing within the technical field. This is advantageous to the apparatus manufacturer, because the games for each system are provided exclusively by a single manufacturer, and entire systems can be readily obsoleted, so that the market will have to purchase a complete unit rather than merely replacement software. Also, competitors cannot easily provide a single game that can be played on different hardware. A solution to this problem is presented in our co-pending application for Video Gaming Apparatus for Wagering with Universal Computerized Controller and I/O Interface for Unique Architecture, assigned Ser. No. 09/405,921, filed Sep. 24, 1999, and application Ser. No. 09/847,051, filed May 1, 2001 (having the same title), the disclosures of which are incorporated herein by reference.

The invention of computerized gaming systems that includes a common or universal video wagering game controller that can be installed in a broad range of video gaming apparatus without substantial modification to the game controller has made possible the standardization of many components and of corresponding gaming software within gaming systems. Such systems desirably will have functions and features that are specifically tailored to the unique demands of supporting a variety of games and gaming apparatus types, and will do so in a manner that is efficient, secure, and cost-effective.

In addition to making communication between a universal operating system and non-standard machine devices such as coin hoppers, monitors, bill validators and the like possible, it would be desirable to provide security features that enable the operating system to verify that game code and other data has not changed during operation.

Alcorn et al. U.S. Pat. No. 5,643,086, as mentioned above, describes a gaming system that is capable of authenticating an application or game program stored on a mass storage media device such as a CD-ROM, RAM, ROM or other device using hashing and encryption techniques. The mass storage device may be located in the gaming machine, or may be external to the gaming machine. This verification technique therefore will not detect any changes that occur in the code that is executing because it tests the code residing in mass storage prior to loading into RAM. The authenticating system relies on the use of a digital signature and suggests hashing of the entire data set during the encryption and decryption process. See also, Alcorn et al. U.S. Pat. No. 6,106,396 and Alcorn et al. U.S. Pat. No. 6,149,522. In particular, U.S. Pat. No. 6,149,522 describes a method for authentication of a casino game data set that, in its broadest concept, requires a) providing a data set for a casino game, b) computing a primary abbreviated bit string that is unique to the data set, c) encrypting the unique abbreviated bit string data set to provide a signature, and d) storing the casino data set and the signature.

In any computer based gaming apparatus, the security of the device and its computer system is extremely important. Operating a security system should be minimally obtrusive in the operation of the games. The internal security systems described above are only one useful method of providing some level of security to the gaming devices. Externally accessible security systems are also desirable. Among commercially available security systems are a series of gaming system validators sold by Kobetron™ Inc. (including at least the Kobetron™ GI-3000) and by DATAMAN, Ltd. (including at least the S4 Validator security system). Both of these systems operate in substantially the same manner. The gaming device is powered down, the device is opened, a memory chip (e.g., an EPROM) is removed from the hardware in the device, the memory chip is inserted into the validation device (usually a hand-held device), the memory chip is read and/or interrogated by the validation device, and after validation has been achieved, the memory chip is reinserted into the gaming device and the gaming device is powered up to enable use of the gaming device by a player. This manual operation must be performed on each individual gaming device and requires the operator to take the machine out of service during the process. It is desired to have a more easily implemented security system that is less intrusive on the play time of the apparatus.

It is further desired by the inventors that the security system and any game program code be identifiable as certified or approved, such as by the Nevada Gaming Regulations Commission or other regulatory agency.

SUMMARY OF THE INVENTION

The present invention relates to hardware systems or gaming engines (and associated software and additive components) that may be constructed in or added to gaming systems, including both computer assisted table gaming systems, reel slot gaming systems and video gaming systems to assist in or effect authentication of data within gaming systems. The gaming engine includes a least one information storage medium that is connected to communicate with a separate processing intelligence. The connection must at least enable communication between the information storage medium and the processing intelligence. The processing intelligence is itself communicatively connected to a processor, such as a host computer and especially a gaming computer. In the gaming industry, the storage medium generally associated with a gaming engine has write protection. This protection may be provided, for example, by operation of the processing intelligence preventing writing onto the storage medium, a firewall-type system, hardware and/or software providing write protection to the storage medium, or any other form of write protection. An alarm system may be provided so that if the storage memory is written upon after installation, an alarm is set-off, but the primary defense is to provide write-prevention into the system. The storage medium may also be Read Only Memory (ROM, EPROM, etc.) which inherently prevents write protection after installation. The memory can be writable memory (such as a hard drive, CD-Rom, Flash memory and the like), but the processing intelligence is programmed to prevent any writing, or any unauthorized writing into memory. The processing intelligence is typically accompanied by associated memory, either the intelligence, the memory or both containing or providing an authentication function or process to authenticate data on the storage medium. Authentication can be performed entirely within the gaming engine or system without any external reading or implements, or the specific design of the system may use or require external access, activation or intelligence. In one preferred form of the invention, any external activity should not be able to write onto the storage medium so that the write-protection is maintained. In another form of the invention, the content of the storage medium may be downloadable from an external secure source, such as a casino computer system network.

The invention provides hardware, systems, devices, an architecture and methods for a wagering game-specific platform that features secure storage and verification of data, including game code, other executable code and any non-executable files, provides the optional ability to securely externally exchange data with a computerized wagering gaming system, provides the optional ability to communicate with a device external to the gaming system, provides the optional ability to communicate with a device external to the gaming machine to transmit data and verification information, and does so in a manner that is straightforward and easy to manage external exchange of information is a relative term that must be explained in the practice of the invention. For purposes of this disclosure, “direct external exchange” is defined as information exchanged between an external device or system and a security device positioned within the gaming machine, without any opening of the game housing and without any unique implement being inserted through a port or special physical information connection. Examples of this communication technique would be through radio frequency (RF) exchange, infrared exchange and the like. A cable, wire, pin connection, fiber optic or other communication port can be used in this semi-direct external exchange. An “indirect external exchange” for purposes of this disclosure requires that the housing be opened and storage media removed and/or the housing is opened and an ICV insert be opened to gain physical communication connection to the memory. This might require removing a chip, such as an EPROM chip, so that the chip may be separately examined for verification. Or, it might require placing a bridge between the EPROM chip and the circuit board, for example. Some embodiments of the invention provide the ability to identify game program code as certified or approved, such as by the Nevada Gaming Regulations Commission or other regulatory agency. The invention provides these and other functions by use of various electronic devices and elements for performing various forms of verification, including hashing, encryption, authentication, and the verification of digital signatures, using a device that is attached (e.g., internally embedded, externally attached, internally attached or distally connected to a computer or housing, etc.) in or to the gaming device and that accesses digital signatures, encrypted files, encrypted compiled files and hash functions as well as using other authentication methods to verify data. Such functions are able to be effected and security and validation performed advantageously to data prior to loading into various memory devices in the gaming machine (such as RAM and NVRAM) and preferably occurs while the gaming machine is in operation.

In a first embodiment within the generic concept of the invention, an Externally Accessible Pass Through Security Device, hereinafter referred to as an EAPTSD (e.g., with a microprocessor) is described as follows. The EAPTSD is preferably a device that is distinct from the host computer and is installed in communicative connection with the gaming apparatus, for example, between the host gaming computer and an at least one storage media, within the gaming machine cabinet. In this example of one alternative embodiment of the invention, the EAPTSD acts as a information gate, and will only allow the host processor to access and load data residing on the storage media that has first been verified. The EAPTSD also prevents the host computer or an external device from writing to the memory, if the memory is writable memory. In one preferred example of the invention, the storage media is writable flash memory. The EAPTSD is optionally accessible from an external communication device such as a hand-held data verification device. The data passing through the EAPTSD to the external communication device may be capable of direct data exchange or semi-direct data exchange.

In a second embodiment within the generic concept of the invention, the entire authentication system (including the processing intelligence and associated memory that validates data stored on at least one storage media and at least one storage media is included within an internal and enclosed housing component that is installed within the gaming housing and placed into communicative connection with the controller. In this embodiment, the entire authentication system preferably resides in a sealed internal compartment that can be visualized by a regulator or technician as being tamper evident. The system components included within the internal housing component also preferably include hardware or hardware and software that blocks writing onto the storage medium. This internal housing and its functional components may be communicatively connected to the controller or computer, by means of a physical connection, for example a pin structure that would allow the device to be plugged into a hard drive port in a computer. This encased system is referred to in the practice of the present invention as a secure disk or Secure Disk™ (2002, Shuffle Master, Inc.) authentication system.

In a third embodiment within the generic practice of the invention, a Read Only Memory board that is pinned to plug into a hard drive port is communicatively connected to a processing intelligence function (which may be a hard drive processor or other processor or microprocessor separate from the host computer, and may exclude an actual hard drive storage media as long as the processing or controlling function is provided, such as by a programmable memory chip).

This form of system is referred to as an Integrated Device Electronics system or IDE system.

DETAILED DESCRIPTION OF THE INVENTION

Figure 1:
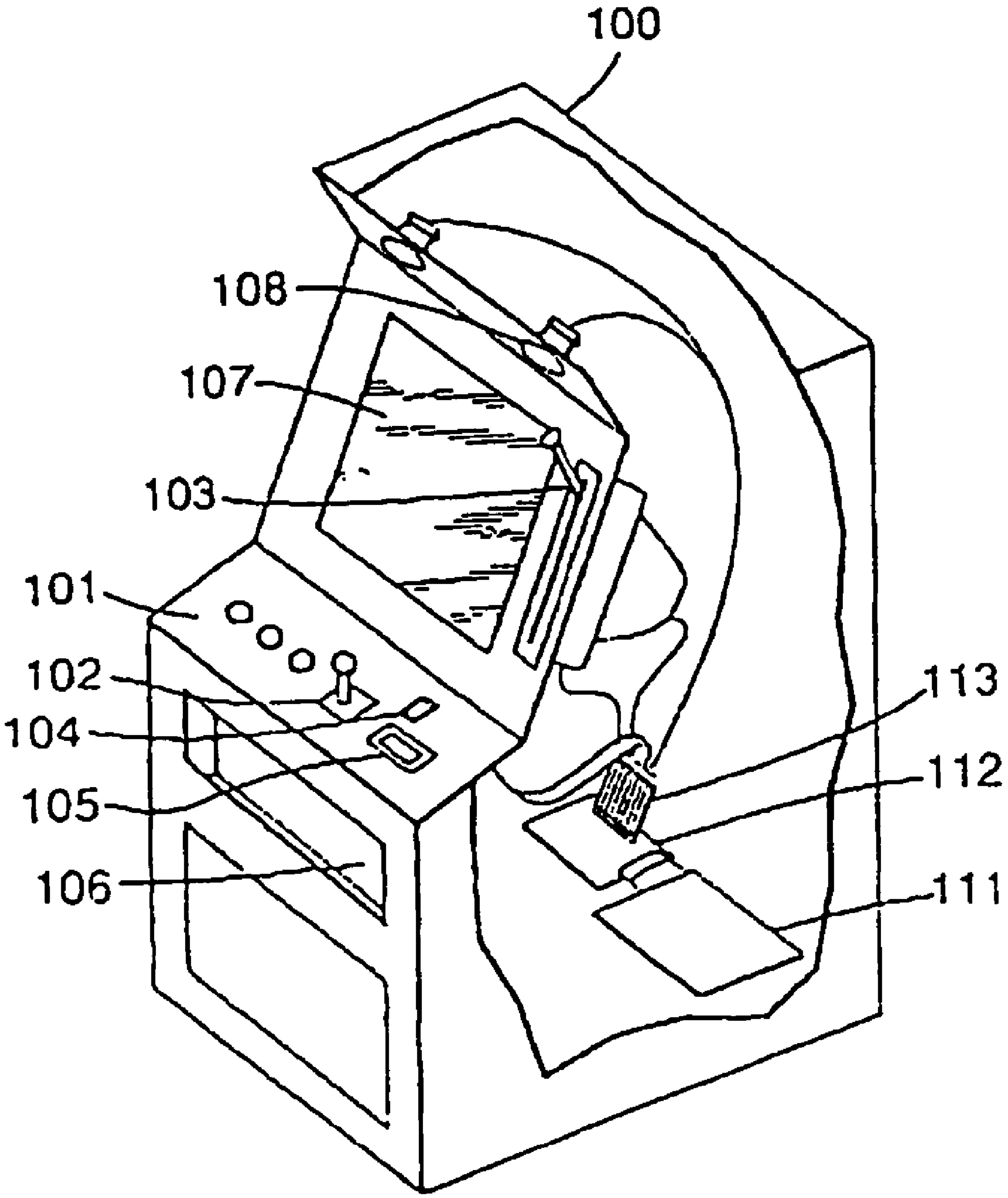
FIG. 1 shows a computerized wagering game apparatus such as may be used to practice some embodiments of the present invention.

In the following detailed description of embodiments of the invention, reference is made to the accompanying drawings that form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The practice of the invention includes the use of a device that can be installed inside of a gaming device and that can be accessed by a device or system located outside of the gaming machine. The system may or may not require a physical data port. For example, the device may be accessed by a pin connection or an RF signal. A second external device or computer system may be plugged into the port or may access data by any other known means or systems in a gaming machine. The second device communicates with the externally accessible memory device (EAPTSD) to verify and authenticate data such as information or code in mass storage while the machine is powered up or running. The EAPTSD can either continuously monitor the storage media or will verify and/or authenticate on request (for example, at the request of a gaming agent) the content of the storage media. For example, the device may be programmed to verify the data every 10 minutes, every 5 minutes, every 1, 2, 3, or 4 minutes or other fixed or variable time interval (e.g., changing with time of day or rate of use), and upon accessing the information with the second external device or external computer system (such as a network), the EAPTSD is programmed to display the last verification output. Alternately, the verification is repeated when the second external device and/or system prompts the EAPTSD to do so. Preferably the device will generate a signal that is an indication that the code has been corrupted, or that the code is still the same and is uncorrupted. This signal can be monitored by the second device, a host computer acting as the second device, the processing intelligence, a centralized monitoring system, or the gaming machine itself.

In a first embodiment of the invention, an Externally Accessible Pass Through Security Device, hereinafter referred to as an EAPTSD (e.g., with a microprocessor) is installed in communicative connection with the gaming apparatus, for example, between the gaming computer and the storage media within the gaming machine cabinet. For example, the EAPTSD may be communicatively between the gaming computer and the storage media, so that the gaming computer must pass data through the EAPTSD to communicate with the storage media. The physical location of the EAPTSD is not critical, and the EAPTSD may be inside the housing (i.e.—the cabinet), on the door of the housing, outside the housing, insertable into a connecting port on the housing, or communicatively positioned at or with an external computer (e.g., a pit computer, central computer, or mainframe, etc.). If located outside of the housing and associated with a separate computer, the EAPTSD may be communicatively positioned in or with the pit computer or host computer or other networking computer. In that manner, a single EAPTSD may be used for a host of gaming devices. The gaming computer communicates with the storage media through the EAPTSD, essentially without the gaming computer or the memory storage being aware of the presence of the EAPTSD. The EAPTSD reads and may evaluate information being transmitted between the gaming computer and the storage media and may selectively store transmitted information, and may approve, disapprove or authenticate unique information (e.g., disallowing any unauthorized attempts to write on the storage media).

The EAPTSD has the ability to validate the storage media during the regular operation of the gaming computer without intervention or other interaction from the gaming computer. The EAPTSD therefore advantageously does not interfere with the processing capability of the game computer. This validation mechanism can be triggered at regularly occurring intervals, in response to communication between the gaming computer and the storage media, or by an external controller through an external communication port or by means of wireless connection. This validation mechanism is independent of the content, formatting or usage of the storage media or the system as a whole. The EAPTSD can potentially be used on any system that has a computer, storage media and the need for validation of the content of the storage media. Thus, the present invention does have a field of utility outside the scope of the gaming industry. For example, the device could be used with ATMs, credit devices, security systems (as with entry security systems), vehicle access (airplane, boat, automotive access) systems, and the like.

For purposes of this disclosure, the term "data" includes executable as well as non-executable code, and raw data such as data files and the like. In one embodiment, the EAPTSD of the present invention provides a method of preparing a game data set for authentication. The method includes providing a game data set. A data authentication program, process, apparatus, system and code that are unique to the combination of the game data set and the encoding/encryption applied, including private keys or other secrets used to create digital signatures, is determined. In one example of the invention, the game data set, the encoded game data set and the message authentication code are validated by the EAPTSD. In another embodiment, the present invention provides a method of authenticating information, including a game and game and operational components used in a gaming system. The method includes creating and receiving an encrypted control file. The encrypted control file is decrypted to provide a control file. The control file includes a set of program files, file names, a set of message authentication codes including a message authentication code unique to each program file, and at least one message authentication code key. The original control file is used by the EAPTSD to authenticate the game.

In another embodiment, the present invention provides the externally accessible memory device in combination with a gaming system. The gaming system in this example includes nonvolatile memory. A control file is stored in the nonvolatile memory. The control file includes a game data set, at least one message authentication code unique to the game data set, and at least one message authentication code key. A game controller is provided, wherein the game controller operates to selectively authenticate the game data set during operation of the gaming system.

In another embodiment, the present invention provides the externally accessible pass through security EAPTSD in combination with a gaming system. The gaming system includes at least one nonvolatile memory device such as NVRAM. An encrypted control file is stored in the nonvolatile memory. The encrypted control file includes a set of program file names, a message authentication code unique to each program file, and at least one message authentication code key. A gaming controller is provided, wherein the gaming controller operates to decrypt the encrypted control file and authenticate the gaming program files during operation of the gaming system. Gaming system devices are provided in communication with the gaming controller via a gaming system interface. Various aspects of the invention may be described as including an authentication enabling system for an electronic gaming system comprising: at least one information storage medium communicatively connected to processing intelligence; the processing intelligence communicatively connected to a gaming computer; wherein the at least one information storage medium is write protected or has read only memory; and the processing intelligence contains an authentication function to authenticate data on the at least one information storage medium. The authentication enabling system may have an outlet port provided on the system to enable read out of results of performance of the authentication function. The system may have a memory storage element that must be directly accessed to enable read out of results of performance of the authentication function. The authentication is preferably a continuous function or at least a closely spaced periodic function (e.g., after performance of one verification cycle, recycling the process at least every half hour, at least every fifteen minutes, at least every five minutes, at least every one minute, at least every 30 seconds, at least every fifteen seconds, at least every 10 seconds, at least every five seconds, at least every second, etc.). It is a preferred structure of the system to have the at least one information storage medium and the processing intelligence contained within a single housing that does not contain gaming peripherals. Gaming peripherals, for example, include coin changers, video screens, audio speakers, currency acceptors, manual controls (e.g., levers, joy sticks, buttons, touch screens, etc.) and other components that are physical systems peripheral to game play. It is preferred to have the at least one intelligence storage medium as read only memory, and even to have all of the intelligence storage medium within the single housing as read only memory. One preferred type of memory is flash memory. The term "single housing" is used to distinguish the container or box with the system in it from the gaming apparatus housing. The authentication system is preferably provided in an apparatus having a reel slot gaming display or a video gaming display comprising a housing containing the authentication enabling system and a separate host game computer. For example, a gaming apparatus may comprise a gaming machine housing, a game computer, a storage media having at least some type of casino game information or data stored thereon, an external accessible port or wireless connection, and an externally accessible pass through security device that can be accessed through the external accessible port or wireless connection, the externally accessible pass through security device being capable of enabling verification of at least some casino game information. The gaming apparatus may also be described as comprising a housing, a game computer having memory, a storage media having at least some casino game information or data, an externally accessible communication port or wireless connection, and communicatively between the game computer and the storage media an externally accessible pass through security device that can be accessed through the externally accessible port or wireless connection, the externally accessible pass through security being capable of enabling verification of casino game information or data. In these last two systems in gaming apparatus housing, for example, the game computer may communicate with storage media through the externally accessible pass through security and the EAPTSD allows communication through the externally accessible communication port or wireless connection to or from the storage media while preventing external communication to the game computer. The gaming apparatus may have the externally accessible pass through security preventing communication through the externally accessible communication port from writing on the storage media.

Alternatively or additionally, the externally accessible pass through security device allows communication to storage media with approval of the communication content. The gaming apparatus may have the externally accessible pass through security device allow communication between the host computer and the storage media and prevent such communication from writing on storage media. The gaming apparatus may have verification communication through the external addressable communication port to externally accessible pass through security device, allowing verification communication to storage media with no contemporary verification communication from the game computer to the storage media. The gaming apparatus may be programmed so that extant verification communication between the externally accessible pass through security device and the storage media may pause when game communication is initiated by the game computer to the storage media. This may be effected where verification communication that has been paused, continues or reinitiates when game communication ceases between the game computer to the storage media. The gaming apparatus may have a microprocessor that can be externally connected to the externally accessible communication port, and verification of casino game information is performed on a microprocessor that is externally connected to the external addressable communication port.

A method of verifying casino gaming data in a computer-based gaming apparatus according to the invention may comprise connecting a computer communication device to an external communication port on a casino gaming apparatus so that the computer communication device is in communication with a) a security device inside of the gaming apparatus that authenticates data on information storage media within the apparatus and is distinct from a game computer and the information storage media in the gaming apparatus, and the computer communication device authenticates casino gaming data in storage media. This method may have the security device continuously authenticating casino gaming data in storage media. The method may be executed wherein so that while the computer communication device is in communication with storage media and the gaming computer communicates with storage media, communication between the computer communication device and the storage media pauses or ceases. The method may operate so that when communication between the gaming computer and the storage media ceases, communication between the computer communication device and the storage media begins or continues. The method may be practiced wherein the computer communication device is in communication with a security device inside of the gaming apparatus is distinct from a game computer and storage media in the gaming apparatus and the security device is in communication with the storage media. The method may provide the computer communication device in communication with a security device inside of the gaming apparatus while the gaming apparatus is powered up and/or wherein the computer communication device is in communication with a security device inside of the gaming apparatus while the gaming apparatus is executing a casino game.

An alternative way of describing a method according to the invention is as a method of verifying casino gaming data in a computer-based gaming apparatus comprising connecting a computer communication device to an external communication port or wireless connection on a casino gaming apparatus so that the computer communication device is in communication with a security device inside of the gaming apparatus that is distinct from a game computer and storage media in the gaming apparatus, and the security device verifies casino gaming data in storage media. The method may be practiced wherein the security device communicates verification of casino gaming data to the computer communication device, the host computer or both. This may be practiced while the computer communication device is exchanging verification information with the security device storage media and the gaming computer communicates with storage media, communication between the computer communication device and the storage media pauses or ceases. Additionally the method may be practiced wherein the computer communication device is in communication with the security device and the security device is in communication with the storage media and the security device is not in communication with the gaming computer. Alternatively the computer may be a communication device in communication with the security device inside of the gaming apparatus while the gaming apparatus is powered up, and/or wherein the computer communication device is in communication with the security device inside of the gaming apparatus while the gaming apparatus is executing a casino game.

The externally accessible pass through security (EAPTSD) may optionally be designed to prevent writing to writable memory storage, such as the compact flash, or nonwritable media such as CD ROM, or any other mass storage device. This would be particularly desirable to gaming agents. The EAPTSD may be activated or accessed by an external controller. The external controller or device may be a hand-held device, or a connection through a network (e.g., through a cable or RF transmission) to a stand-alone device, such as a host computer or central computer. Upon activation, the content of the mass storage device is outputted (e.g., in serial form), and a signature or other verifiable code created. The signature or code is then compared with known signatures or code to determine if there is a match. Alternatively, the signature or other verifiable code may be created in the EAPTSD and the signature is sent to the external controller for matching in its database of known signatures. The validator in some embodiments can also have connectors for or may be designed to work exclusively with (again with external access through an external hard wired or wireless port on the gaming device) other types of storage devices such as EPROMS, chips (e.g., Pick chips), circuit boards, logic devices, memory devices, and the like and is capable of verifying data on that media also.

The EAPTSD may or should be able to verify at a "lower level" than the encryption methods we have described in commonly assigned three pending applications, all entitled "Encryption (Authentication) in a Secure Computerized Gaming System", assigned Ser. No. 09/520,404, filed on Mar. 8, 2000, PCT application PCT/US 01/07381, filed Mar. 8, 2001 and application Ser. No. 09/949,021 filed Sep. 10, 2001 (which applications are incorporated herein by reference) and U.S. Pat. Nos. 5,643,086; 6,149,522; and 6,106,396 (which are also incorporated herein by reference), and that any of those encryption methods may be used in combination with the EAPTSD to secure any or all of the data. Since the technique uses separate intelligence to perform the verification step, the process does not tax the resources of the host computer and does not interfere with the performance of the machine. The verification can therefore advantageously occur simultaneously with boot up and therefore increase the speed in which the machine becomes ready for operation.

In one example of the invention, all of the encryption and authentication capabilities reside in the EAPTSD. The EAPTSD can utilize any of the encryption techniques described above and incorporated herein by reference. In another example, the "lower level" security takes place in the EAPTSD, and higher level security is in the operating system, (or "O/S"), as described in the above patents and applications. It appears that it is most desirable to verify only code that is going to be read by the gaming machine, instead of all of code and memory. Some of the above-described encryption techniques can zero out all unused storage, which might address some of the issues raised below (in the discussion of why it is undesirable to verify all of the code).

The present invention may use an EAPTSD in various embodiments in combination with a structure that provides an architecture and method for a universal operating system that features secure storage and verification of game code, game data and other code and/or data, provides the ability to securely exchange data with a computerized wagering gaming system, and does so in a manner that is straightforward and easy to manage. Some embodiments of the invention provide the ability to identify game program code as certified or approved, such as by the Nevada Gaming Commission or other regulatory agency. The invention provides these and other functions by use of authentication, including digital signatures and hash functions as well as other encryption or authentication methods to data being verified. Because hash functions and other encryption methods are employed widely in the present invention, they are introduced and discussed below.

"Hash functions" for purposes of this disclosure are a type of function that generates a unique data string from a specific set of data, typically of fixed length from variable strings of characters or text. The data string generated is typically substantially smaller than the text string itself, but is long enough that it is unlikely that the same number will be produced by the hash function from different strings of text (e.g., up to 230 integers, 260 integers, 2100 integers, 2160 integers or more). The formula employed in the hash function must also be chosen such that it is unlikely that different text strings will produce the same hash value. An example of a suitable hash function is a 160 bit SHA hash. Regardless of file size, the hash value will be 160 bits in length.

The hashed data string is commonly referred to as a "message digest." A message digest can be stored for future use, or encrypted and then stored in nonvolatile memory, for example.

Hash functions are often used to hash data records to produce unique numeric values corresponding to each data record in a database, which can then be applied to a search string to reproduce the hash value. The hash value can then be used as an index key, eliminating the need to search an entire database for the requested data. Some hash functions are known as one-way hash functions, meaning that with such a function it is extremely difficult to derive a text string that will produce a given hash value, but relatively easy to produce a hash value from a text string. This ensures that it is not feasible to modify the content of the text string and produce the same hash value.

Such a function can be used to hash a given character string and produce a first hash value that can later be compared to a second hash value derived from the same character string, to ensure the character string has not changed.

If the character string has been altered, the hash values produced by the same hash function will be different. The integrity of the first hash value can be protected against alteration by use of other encryption methods such as the use of a digital signature.

Digital signatures are employed to sign electronic documents or character strings, and ensure that the character string has not been altered since signing. Digital signatures typically are employed to indicate that a character string was intentionally signed with an unforgeable signature that is not reusable with another document, and that the signed document is unalterable. The digital signing mechanism or method is designed to meet these criteria, typically by using complex mathematical encryption techniques.

One example is use of a public key/private key encryption system to sign a document. In a public key/private key system, a user has a pair of keys, either of which may be used to encrypt or decrypt a document. The public key is published or distributed in a manner that reasonably ensures that the key in fact belongs to the key owner, and the private key is kept strictly secret. If someone wishes to send a character string that only a certain person may read, the character string is encrypted before sending using the intended reader's public key. The character string is then visible only by using the intended reader's private key to decrypt the character string.

However, if a user wishes to send a character string in such a manner that the document is virtually guaranteed to be the authentic document created by the sender but essentially anyone can read it, the user can sign the document by encrypting it with his private key before sending. Anyone can then decrypt the document with the signer's public key that is typically widely distributed, and can thereby verify that the character string was signed by the key pair owner. This exemplary embodiment meets the requirements of a digital signature, ensuring that a character string was intentionally signed with an unforgeable signature that is not reusable with another document, and that the signed document is unalterable.

Because encryption of large character strings such as large computer programs or long text documents can require a substantial amount of time to encrypt and decrypt, some embodiments of digital signatures implement one-way hash functions. In one such embodiment, the signer uses a known one-way hash algorithm to create a hash value for the character string, and encrypts the hash value with his private key. The document and signed hash value are then sent to the recipient, who runs the same hash function on the character string and compares the resulting hash value with the hash value produced by decrypting the signed hash value with the signer's public key. Such a method provides very good security, as long as the hash function and encryption algorithm employed are suitably strong.

Encryption of data via a public key/private key system is useful not only for producing digital signatures, but also for encryption of data before sending or storing the data or to keep data secure or secret in other applications. Similarly, symmetric encryption techniques which rely on encryption and decryption of the same single secret key may be applied to such applications. For example, transmission of program data between a network server and a computerized wagering game apparatus may be secured via a symmetric encryption technique, and the program data received in the game apparatus may be verified as approved by a regulatory agency via a digital signature employing hash functions and public key cryptography before execution.

Other encryption methods and formulas exist, and are also usable consistent with the present invention. Some symmetric encryption methods, such as DES (Data Encryption Standard) and its variants rely on the secrecy of a single key, and so may not be adaptable to those specific methods described as a narrow practice within the generic scope of the present invention herein that require a key pair with a public key. A variety of other encryption methods, such as RSA and Diffie-Hellman are consistent with public/private key methods, and are usable in these methods. Various hash functions may also be employed, such as MD5 or SHA, and will be useful in many aspects consistent with the present invention so long as they are sufficiently nonreversible to be considered one-way hash functions. Various authentication methods will also provide varying degrees of security, from those that are relatively easy to defeat to those that are extremely difficult to defeat. These various degrees of security are to be considered within the scope of authentication methods consistent with this application, including various degrees of security that may to varying degrees of probability make encrypted data unforgeable, unreadable, or the like. A variety of authentication methods exist and are expected to be developed in the future, all of which are likely to be employable in some aspect consistent with the present invention, and are within the scope of the invention.

FIG. 1 shows an exemplary gaming system 100, illustrating a variety of components typically found in gaming systems and how they may be used in accordance with the present invention. User interface devices in this gaming system include push buttons 101, joystick 102, and pull arm 103. The device could also include a touch screen (not shown). Credit for wagering may be established via coin or token slot 104, a device 105 such as a bill receiver or card reader, a ticket reader, a player tracking card, or any other credit input device. A card reader 105 may also provide the ability to record credit information on a user's card when the user has completed gaming, or credit may be returned via a coin tray 106 or other credit return device. Credit status may also be transmitted to a central computer system. Information is provided to the user by devices such as video screen 107, which may be a cathode ray tube (CRT), liquid crystal display (LCD) panel, plasma display, light-emitting diode (LED) display, or other display device that produces a visual image under control of the computerized game controller. Also, buttons 101 may be illuminated to indicate what buttons may be used to provide valid input to the game system at any point in the game. Still other lights or other visual indicators may be provided to indicate game information or for other purposes such as to attract the attention of prospective game users. Sound is provided via speakers 108, and also may be used to indicate game status, to attract prospective game users, or for other purposes, under the control of the computerized game controller.

The gaming system 100 further comprises a computerized universal game controller 111 and I/O interface 112, connected via a wiring harness 113. The universal game controller 111 need not have its software or hardware designed to conform to the interface requirements of various gaming system user interface assemblies, but can be designed once and can control various gaming systems via I/O interfaces 112 designed to properly interface an input and/or output of the universal computerized game controller to the interface assemblies found within the various gaming systems. Examples of suitable univeral game controllers and I/O interface designs are described in commonly assigned application Ser. No. 09/405,921, filed Sep. 24, 1999 and application Ser. No. 09/847,051, the disclosures of which are herein incorporated by reference.

In some embodiments, the universal game controller 111 is a standard IBM Personal Computer-compatible (PC compatible) computer. Still other embodiments of a universal game controller comprise general purpose computer systems such as embedded controller boards or modular computer systems. Examples of such embodiments include a PC compatible computer with a PC/104 bus, which is an example of a modular computer system that features a compact size and low power consumption while retaining PC software and hardware compatibility. The universal game controller provides all functions necessary to implement a wide variety of games by loading various program code on the universal controller, thereby providing a common platform for game development and delivery to customers for use in a variety of gaming systems. Other universal computerized game controllers consistent with the present invention may include any general-purpose computers that are capable of supporting a variety of gaming system software, such as universal controllers optimized for cost effectiveness in gaming applications or that contain other special-purpose elements yet retain the ability to load and execute a variety of gaming software.

In yet other embodiments, the universal controller with security features can be used for other applications, including controlling networked in-line systems such as progressive controllers and player tracking systems. The invention can also be used for kiosk displays and creating picture in picture features on a video display.

The universal computerized game controller of some embodiments is a computer running an operating system with a gaming application-specific kernel such as a customized Linux kernel. In further embodiments, a system handler application layer of code executes within the kernel, further providing common game functionality to the programmer. The game program in such embodiments is therefore only a fraction of the total code, and relies on the system handler application layer and kernel to provide commonly used gaming functions. Still other embodiments will have various levels of application code, ranging from embodiments containing several layers of game-specific code to a single-layer of game software running without an operating system or kernel but providing its own computer system management capability.

Figure 2:
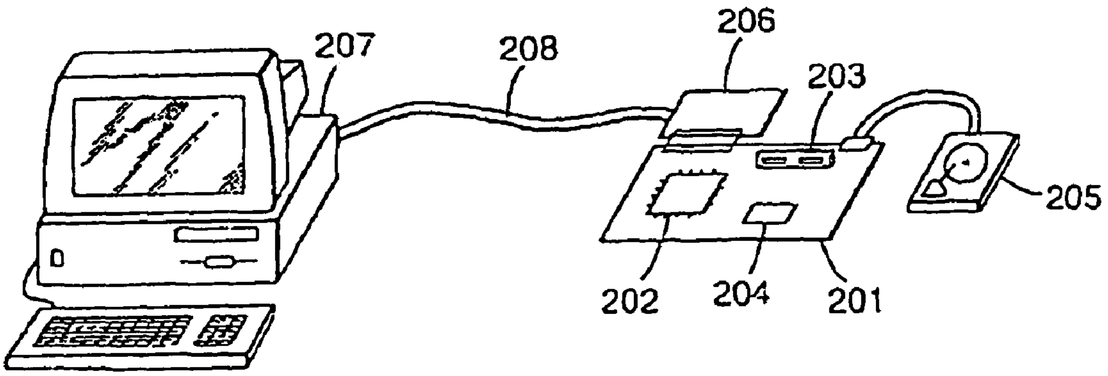
FIG. 2 shows a diagram of a networked computer connected to certain components comprising a portion of a computerized wagering game apparatus, consistent with some embodiments of the present invention.

FIG. 2 illustrates a networked computer connected to selected devices that comprise a part of a computerized wagering game apparatus, as are used in various embodiments of the present invention. The computerized game controller 201 has a processor 202, memory 203, and nonvolatile memory 204. One example of nonvolatile memory is a flash disk on chip (hereinafter "flash disk"). The flash disk is advantageously read/write, yet retains information stored on disk upon power down. Attached to the computerized game controller of some embodiments is a mass storage device 205, such as a CD ROM, and a network interface adaptor 206. The network interface adaptor is attached to a networked computer 207 via network connection 208. The various components of FIG. 2 exist within embodiments of the invention, and are illustrated to show the manner in which the various components are associated.

The computerized wagering game controller of the invention is operable to control a computerized wagering game, and is operable to employ authentication in various embodiments to provide data security. The computerized game controller 201 in some embodiments is a general-purpose computer, such as an IBM PC-compatible computer. The game controller executes an operating system, such as Linux or Microsoft Windows, which in further embodiments is modified to execute within the computerized gaming apparatus. The computerized game controller also executes game code, which may be loaded into memory 203 from either a mass storage device 205 such as a hard disc drive, or nonvolatile memory 204 such as flash memory or EPROM memory before execution. In some embodiments, the computerized game controller 201 loads encryption functions into memory 203, and those functions are subsequently executed to securely load other gaming system data from the mass storage device 205.

In further embodiments, the computerized game controller exchanges data with a networked computer 207 via a network connection 208 and a network interface adapter 206. Data exchanged via the network connection is encrypted in some embodiments of the invention, to ensure security of the exchanged data. The data to be exchanged in various embodiments comprises game program data, computerized gaming apparatus report data, data comprising commands to control the operation of the computerized gaming apparatus, and other computerized gaming apparatus data. Employing encryption in exchanging such data provides a degree of security, ensuring that such data is not altered or forged.

The invention may employ the EAPTSD in combination with authentication, as by encryption, including hash functions, symmetric encryption, zero knowledge proofs, and public key/private key encryption in various embodiments, which provides a degree of confidence that data utilized by the computerized gaming system and protected by encryption in accordance with the invention is not altered or forged. The data within the scope of the invention includes but is not limited to data comprising programs such as operating system or game program data, computerized gaming machine status data such as credits or other game state data, control instruction data for controlling the operation of the computerized gaming apparatus, and other computerized gaming machine data.

One embodiment of the invention may use authentication programs that comprises the use of hash functions to calculate a reference hash value for selected data, which can later be compared to a hash value calculated from the same data or a copy of the data to ensure the data has not been altered. The hash functions employed will desirably be one-way hash functions, to provide a greater degree of certainty that the reference hash value cannot be used in reverse to produce corresponding altered data. In a further embodiment, the data is hashed repeatedly by a continuously executing program thread that ensures that the data is not altered during the course of operation of the computerized wagering game. The data that is continuously hashed is in some embodiments is continuously hashed after being loaded into memory 203 for use by the computerized game controller.

If the reference hash value and the calculated hash value do not match, the computerized gaming apparatus will desirably provide some indication of the hash failure. In one embodiment, the game is brought to a locked or "tilt" state that prevents wagering upon a hash check failure. In a further embodiment, notification of the hash failure is sent to a networked computer 207 to alert the computer's user of the hash failure. In some embodiments, the computerized wagering game apparatus provides limited function to check the status of the game, including in further embodiments functions accessible only by operating controls within the computerized wagering game apparatus secure housing.

In one embodiment, the operating system as described in copending application for Computerized Gaming System, Method and Apparatus, having Ser. No. 09/520,405 and filed on the Mar. 8, 2000, cooperates with a library of "shared objects" that are specific to the game application (the disclosure is herein incorporated by reference). For purposes of this disclosure, a "shared object" is defined as self-contained, functional units of game code that define a particular feature set or sequence of operation for a game. The personality and behavior of a gaming machine of the present invention are defined by the particular set of shared objects called and executed by the operating system. Within a single game, numerous shared objects may be dynamically loaded and executed. This definition is in contrast with the conventional meaning of a shared object, which typically provides an API to multiple programs. An API is defined as an Application Programming Interface, and includes a library of functions.

Figure 3:
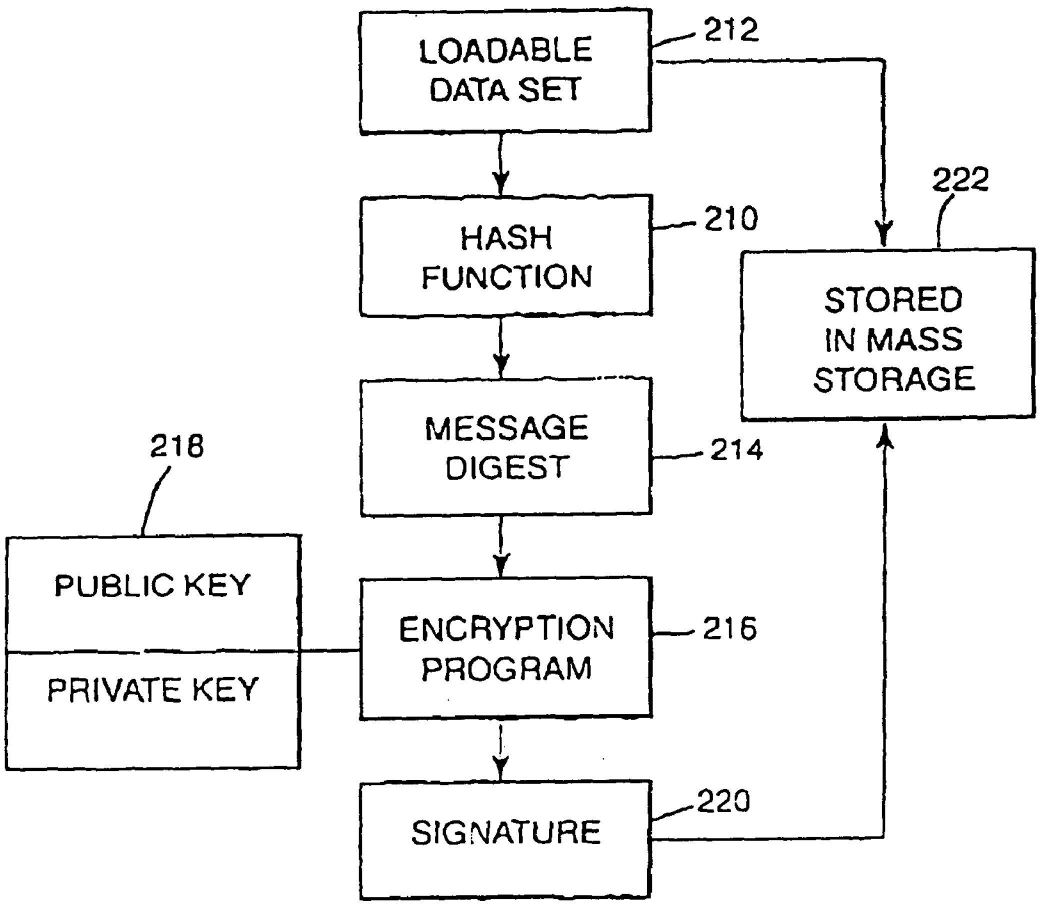
FIG. 3 is a diagram of a process of creating a signature for a loadable data set, utilizing a public/private key algorithm.

The shared object code, as well as other data may be verified according to one embodiment of the present invention by first preparing a signature from data, as shown in FIG. 3. The signature may be prepared by first hashing 210 the data set 212 to create a message digest 214. The message digest is encrypted via an encryption program that is stored on ROM utilizing a private/public key algorithm 218, forming a unique signature 220. The data and signature are then stored on a mass storage device 222 such as a network storage device, hard drive, CD-ROM, RAM, flash disk or the like.

In one embodiment, the shared objects for a particular application and their corresponding signatures are stored 224 in flash memory. The data on this flash memory is preferably verified by the device of the present invention. When the shared objects are called, it is copied into RAM, where it is hashed 226 utilizing higher level verification, on a frequent periodic basis. The shared objects may be hashed from flash memory, or loaded into RAM and then hashed from RAM. Utilizing a Linux, Unix or other similar operating system advantageously permits the location of data in RAM. Data verification in RAM has the distinct advantage that errors will be caught at the time they occur, rather than when the data is loaded or reloaded. The verification technique of the present invention advantageously prevents data from loading if it cannot be verified, and/or while running but as soon as an error is detected. This could save casinos untold amounts by avoiding the payment of jackpots and the like based on machine malfunction. Since hashing is a batch process, the process is not continuous. However, when the hashing takes relatively little time, such as 10 seconds for example, the process can repeat itself so that the data verification in RAM is in effect, continuous.

Figure 4:
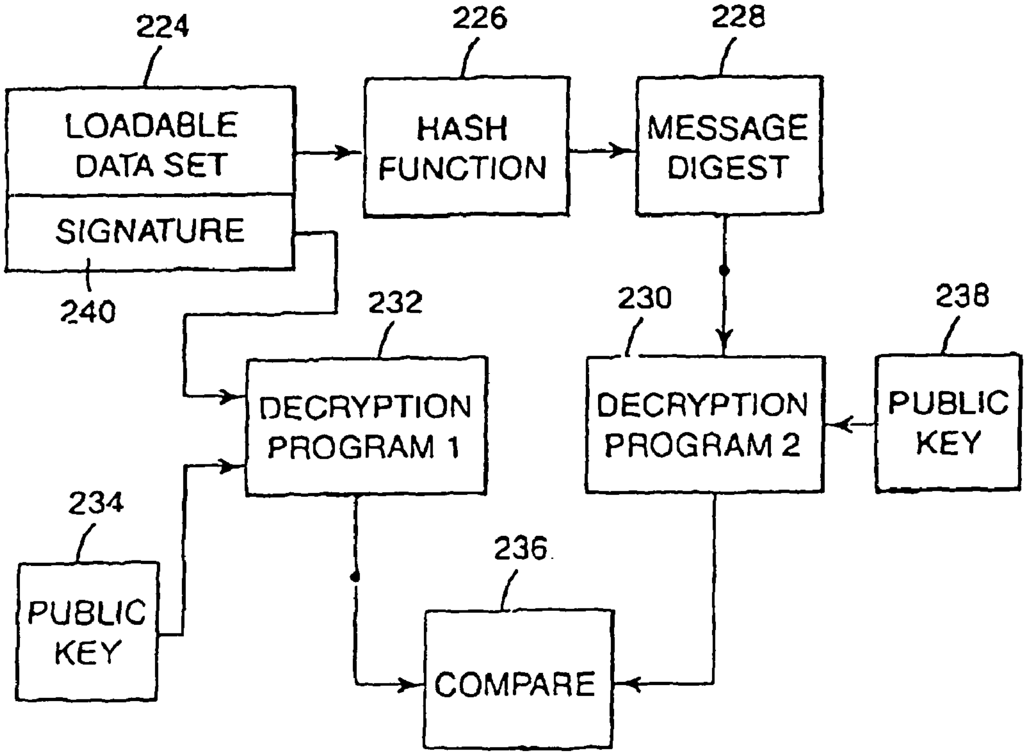
FIG. 4 is a diagram of a process for verifying a loadable data set has not changed during operation of the gaming device.

The message digest 228 (as shown in FIG. 4) created from hashing the shared object is preferably encrypted, as part of the higher level verification processes. A public key 238 is used to decrypt the message digest utilizing a first decryption program. The signature 240 stored in flash memory is decrypted using a second decryption program via a public key 234 and the values are compared 236. Although code verification of the gaming program shared objects has been described in detail above, code verification utilizing hash functions and signatures can be applied to verify the authenticity of the Linux kernel, modular modifications to the kernel, the operating system, game state data, random number generation data and the like. As added security, the present invention contemplates zeroing out all unused RAM to verify that no data in the form of code or other data was intentionally or unintentionally inserted.

In various embodiments, selected data is protected with encryption by signing the data with a digital signature that is verified to ensure integrity of the data. In some embodiments, the digital signature comprises signing the selected data with a signer's private key such that the data can only be decrypted by using the corresponding public key. Because only the intended signer knows his private key and documents encrypted with other private keys cannot be decrypted with the intended signer's public key, successful decryption of data with the intended signer's public key provides a degree of certainty that the data was signed or encrypted by the intended signer.

But, because public key/private key encryption algorithms typically take a relatively long time to encrypt large amounts of data, the encryption algorithm is more efficiently used in some embodiments to encrypt a unique characteristic of the data such as the hash value from a one-way hash function. In such an embodiment, the signer derives the reference hash value with a one-way hash function for the data to be signed, and encrypts the resulting hash value with his public key. One-way hash functions typically may be applied to data much more quickly than public key/private key algorithms, and so it is more desirable to process the entire data to be signed with a hash function than with a public key/private key algorithm. In some embodiments of the invention, only the hash value needs to be encrypted with public key/private key encryption, greatly reducing the time needed to sign or verify large amounts of data. To verify the signature, the hash value is decrypted with the intended signer's public key and the decrypted reference hash value is compared to a newly-computed hash value of the same data. If the reference hash value matches the newly-computed hash value, a degree of certainty exists that the signed data has not been altered since it was signed.

In some embodiments using digital signatures, the digital signature is that of a regulatory agency or other organization responsible for ensuring the integrity of data in computerized wagering game systems. For example, the Nevada Gaming Regulations Commission may apply a signature to data used in such gaming systems, ensuring that they have approved the signed data. Such an embodiment will be useful to ensure that game code executing in these systems has been approved and not altered since approval, and provides security both to the game operator or owner and to the regulatory commission. In other embodiments, the digital signature is that of the game code manufacturer or designer, and ensures that the game code has not been altered from its original state since signing.

Secure storage of the reference hash values or public keys in the systems described above is important, because data can be more easily forged if the reference hash values or public keys used to verify the integrity of the data can also be altered. For this reason, the reference hash values, public keys, or other encryption key data is stored in nonvolatile memory 204. In some embodiments, the nonvolatile memory 204 is a flash memory or EPROM that is programmable, but is not readily altered by a user of the computerized wagering game apparatus. The nonvolatile memory in such embodiments is reprogrammable, but reprogramming requires in various embodiments the use of special hardware, execution of restricted functions, or other secure methods. In other embodiments, the nonvolatile memory 204 is a programmable memory that is not alterable, requiring replacement of the nonvolatile memory each time new encryption key data is needed. Such embodiments have the advantage that the nonvolatile memory 204 must be physically removed and replaced to alter the data, providing a degree of access security and allowing visual verification of the identity of the nonvolatile memory and its contents.

In still other embodiments, the encryption key data is stored on the mass storage device. Further embodiments include storage of the encryption key data embedded in encryption functions, storage in secure areas of a hard disc drive mass storage device, or use of other security methods to protect the encryption key data.

These encryption methods in some embodiments of the invention are also applied to computerized gaming system communication over a network. Data communicated over a network is in various embodiments of the invention verified by use of a hash function, verified by use of public key/private key encryption, verified by use of symmetric encryption, or verified by use of digital signatures. Also, a variety of key exchange or key negotiation protocols exist which in some embodiments of the invention provide the capability for a networked computerized gaming system to publicly agree with another networked computer system on encryption keys that may be subsequently used to communicate securely over a network.

Such network communication methods are utilized in the invention to provide for secure exchange of data between computerized wagering game systems and other networked computer systems. For example, control commands that control certain aspects of the operation of the computerized wagering games are securely sent over a network in some embodiments of the invention. Such commands may include increasing odds of payout on selected computerized wagering game systems, or changing the game program that is executed on selected computerized wagering game systems at selected times of the day. The computerized wagering games in some embodiments securely report game data such as bookkeeping data to a networked computer 207 via encryption. In still other embodiments of the invention, wagering game program data is securely transmitted over the network to the computerized wagering game systems, providing a secure way to provide new wagering games to the systems without physically accessing each computerized wagering game system. Various embodiments of the invention transmit other computerized wagering game data over a network connection via encryption, and are within the scope of the invention.

Because encryption methods typically provide a degree of security that is dependent on the effort and expense a hacker is willing to invest in defeating the encryption, replacement of encryption keys is employed in some embodiments of the invention. Digital signatures in some embodiments are valid only for a predetermined period of time, and in further embodiments have an associated date of expiry after which they may no longer be used. Such methods can also be used in various embodiments of the invention to license games for use for a certain period of time, after which they will not be properly verified due to expiry of the encryption keys used for data verification. Because hash functions typically produce hash values that are dependent entirely on the data being hashed, embodiments of the invention which incorporate expiry and replacement of reference hash values also require reissuance of modified data to produce a different hash value. For example, minor bug fixes, addition of new features, or any other small change in the data comprising a gaming program will be sufficient to produce a different reference hash value upon hashing the edited program data, resulting in an updated reference hash value corresponding to the updated data.

Other embodiments use a variety of keys among various computerized wagering games and game producers, reducing the risk and therefore the value of successfully defeating an encryption key. For example, a game producer in one embodiment employs a different digital signature for each customer of its computerized wagering games, ensuring that defeating the encryption key on a single game system affects a limited number of games. In another embodiment, a regulatory agency may change keys with which it signs games on a periodic basis, so that a successful hack of the keys used to sign the data results in potential compromise of only a limited and identifiable number of games. It will be obvious to one skilled in the art that many variations on key replacement and expiry policies exist, all of which are considered within the scope of the present invention.

The invention provides an architecture and method for a gaming-specific platform that features secure storage and verification of game code and other data, provides the ability to securely exchange data with a computerized wagering gaming system, and does so in a manner that is straightforward and easy to manage. Some embodiments of the invention provide the ability to identify game program code as certified or approved, such as by the Nevada Gaming Regulations Commission or other regulatory agency. The invention provides these and other functions by use of authentication, including digital signatures and hash functions, and zero knowledge proofs, as well as other encryption methods.

Figure 5:
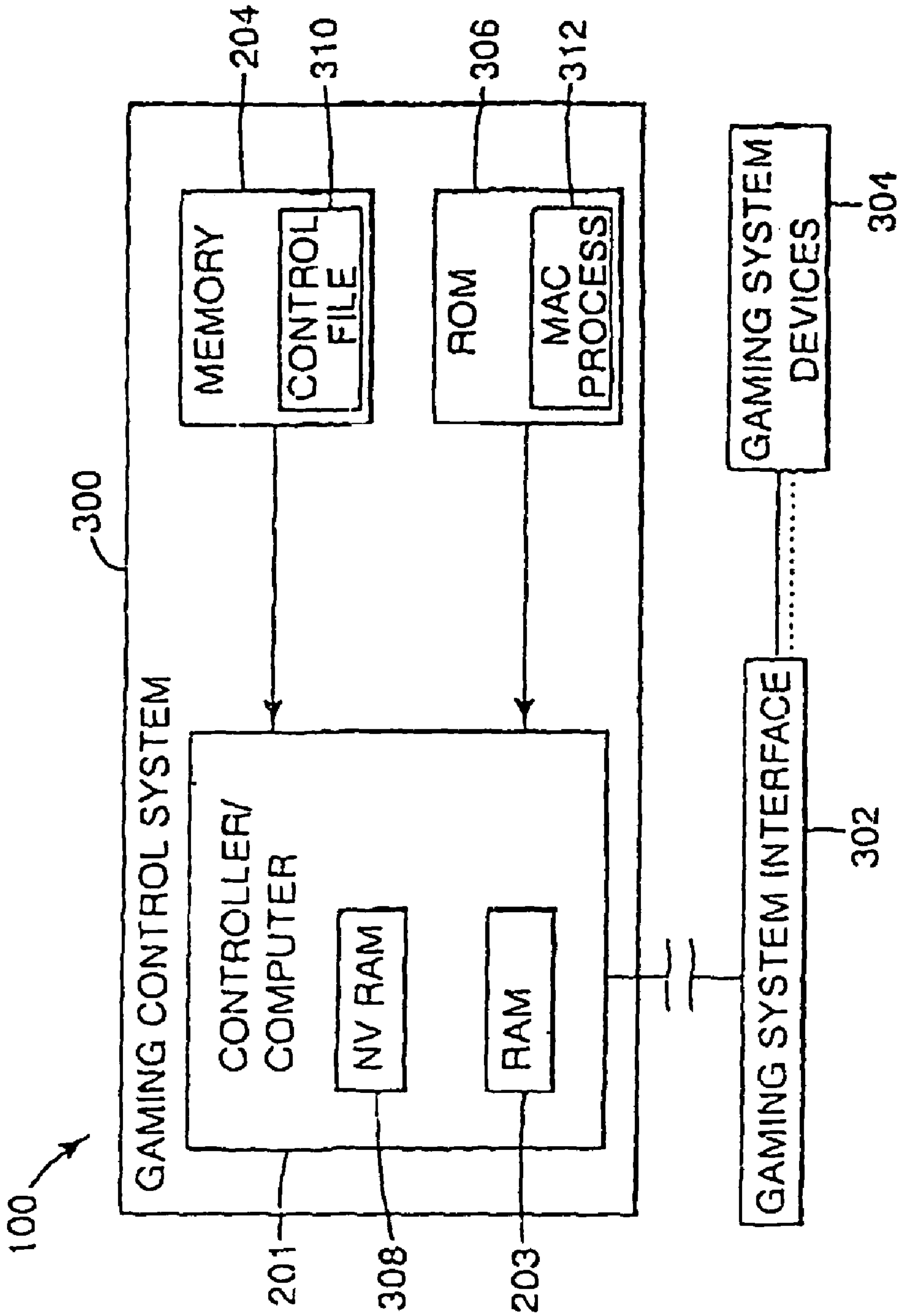
FIG. 5 is a block diagram illustrating one exemplary embodiment of a gaming system according to the present invention.

FIG. 5 is a block diagram illustrating one exemplary embodiment of a gaming system according to the present invention. The gaming system block diagram is representative of gaming system 100 shown in FIG. 1 and FIG. 2, and previously described herein. The gaming system 100 includes a unique system and method for preparing a game data set for authentication and authenticating a game used in the gaming system 100. The gaming system 100 includes a process which securely verifies that the gaming data set, including program files, have not been altered, either intentionally or unintentionally, changing the outcome of a game played on the gaming system 100.

Components of the present invention can be implemented in hardware via a microprocessor, programmable logic, or state machine, in firmware, or in software within a given device. In one preferred embodiment, one or more components of the present invention reside in software. Components of the present invention may also reside in software on one or more computer-readable mediums. The term computer-readable medium as used herein is defined to include any kind of memory, volatile or nonvolatile, such as floppy disks, hard disks, CD-ROMs, flash memory, read-only memory (ROM), and random access memory (RAM). In addition, gaming system 100 can employ a microprocessor embedded system/appliance incorporating tailored appliance hardware and/or dedicated single purpose hardware.

In one aspect, gaming system 100 includes a gaming control system 300, gaming system interface 302, and gaming system devices 304. Gaming control system 300 includes computer or controller 201, nonvolatile memory 204, and nonvolatile memory 306. Controller 201 includes memory 203 and nonvolatile RAM (NVRAM) 308. In one aspect, memory 203 is random access memory. In one aspect, the random access memory 203 is dynamic random access memory (DRAM). The nonvolatile random access memory includes a battery backup for maintaining data stored in memory upon loss of power. In one embodiment, NVRAM 308 is used for storing crucial gaming data, such as slot machine reel settings, payoff percentages, and credits.

In one embodiment, program memory 204 is a read/writeable, nonvolatile memory. In one aspect, the writeable memory 204 is flash memory. One suitable nonvolatile memory is commercially available under the trade name "Disk on a Chip" commercially available from M Systems, and Avnet of Phoenix, Ariz. Other nonvolatile memory suitable for use with the present invention will become apparent to one skilled in the art after reading the present application.

Nonvolatile memory 204 is used to store a game data set, which is defined to include game specific code or gaming program files. Exemplary game specific code includes game code, game data, game sound, game graphics, game configuration files, or other game specific files. The game specific code or program files are directed to specific types of games run on the gaming system, such as Blackjack, poker, video slot machines, or reel slot machines. In one embodiment, nonvolatile memory 306 is read only memory (ROM) such as an EEPROM. Nonvolatile memory 306 is used to store gaming system operating code. Upon power up or operation of the gaming system, the gaming system operating code and game data sets are transferred into memory, preferably volatile memory 203, for fast access by controller 201 for operation of the gaming system. During operation of the gaming system 100, controller 201 interfaces with gaming system devices 304 via gaming system interface 302 for operation of the gaming system 100. Gaming system interface 302 may include network interface 206, network computer 207, and network connection 208 previously detailed herein. Gaming system devices 304 include mechanical, electrical, hardware, software or video devices, such as pushbuttons 101, joystick 102, pull arm 103, token or slot 104, device 105, point tray 106, video screen 107 and speakers 108 previously detailed herein.

The gaming system 100 according to the present invention includes an encrypted control file 310 and associated game files stored in the nonvolatile memory 204. The encrypted control file 310 includes the game data set, such as game specific code and program filenames, message authentication codes unique to the program filenames, and a message authentication code key. A message authentication code process 312 is stored in nonvolatile memory 306. In one aspect, the control file 310 is encrypted. The control file 310 is used in connection with the message authentication code process 312 to provide game data security during operation of the gaming system 100, as part of a game authentication/verification process. The game authentication/verification process is described in detail in reference to the following FIGS. 6-11.

Figure 6:
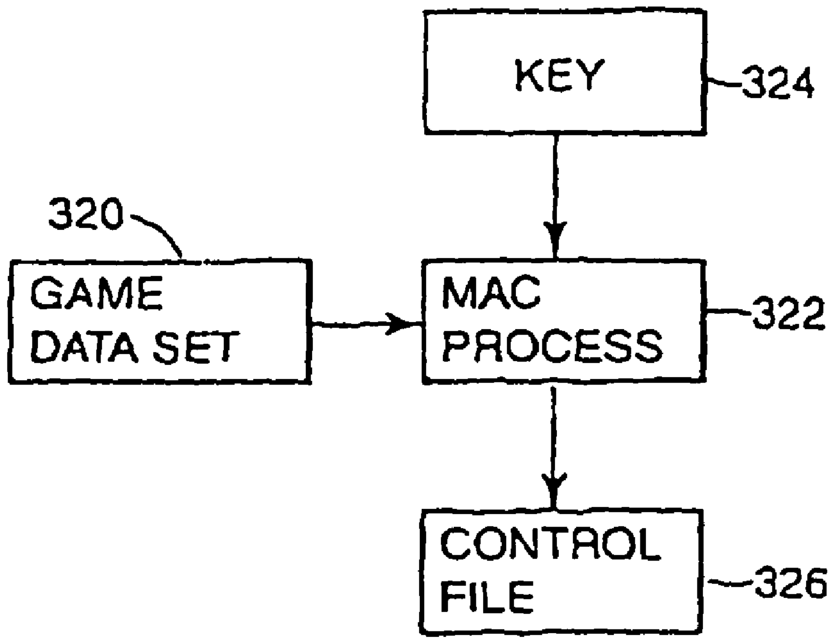
FIG. 6 is a diagram illustrating one exemplary embodiment of a process for preparing a game data set for authentication according to the present invention.

FIG. 6 is a diagram illustrating one exemplary embodiment of a method of preparing a game data set for authentication. A game data set is indicated at 320. As indicated herein the game data set 320 includes game specific code filenames or program filenames for game files, such as game code, game data, game sound, game graphics, game configuration files, and other game specific files. A message authentication code is determined which is unique to the game data set 320 but may be or is determined using less than the whole game data set (i.e., the whole data set being the program file and program filenames). The message authentication code is determined using a message authentication code process 322 (MAC process). In one aspect, the message authentication codes are determined using the filenames associated with the program files, resulting in fast determination of the unique message authentication codes. The term message authentication code as used herein, also known as a data authentication code, is a one-way hash function with the addition of a secret key, indicated as message authentication code key 324. A resultant hash value is a function of both the pre-image game data set 320 and the message authentication code key 324. See, Applied Cryptography, 1996 Second Edition, by Bruce Schneier, Chapter 18 which is incorporated herein by reference.

The output of the message authentication code process 322 is stored. In one aspect, the game data set, the message authentication code, and the message authentication code key are stored in a control file 326 in memory. The method authentication code may be and is preferably provided by random selection or random generation of authentication codes. In this manner, the program operates to provide an encrypted data set (e.g., the entirety of all files or a subset of the files in a compiled file) with the code key embedded in the encrypted compiled file. The key cannot reasonably be decrypted by finding an external code key, as the encryption code was generated randomly and was not necessarily separately identified or stored or passed, except to the extent that it is embedded in the encrypted compiled file.

Figure 7:
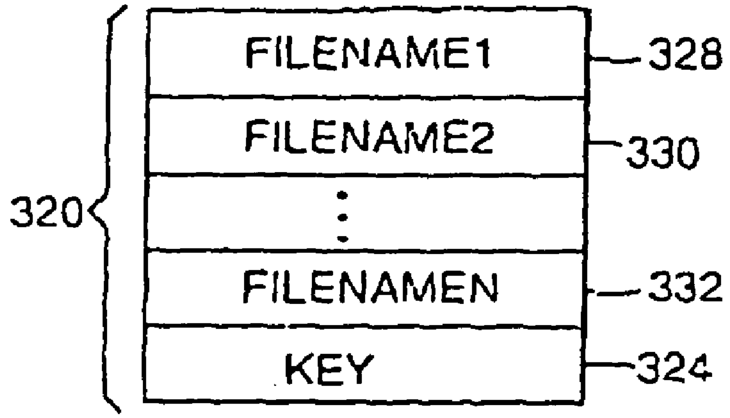
FIG. 7 is a diagram illustrating one exemplary embodiment of a game data set and key used in a gaming system according to the present invention.

FIG. 7 is a diagram illustrating one exemplary embodiment of game data set 320 and message authentication code key 324. In one aspect, game data set 320 includes a plurality of game specific code or program filenames, indicated as FILENAME1 328, FILENAME2 330, through FILENAMEN 332.

Figure 8:
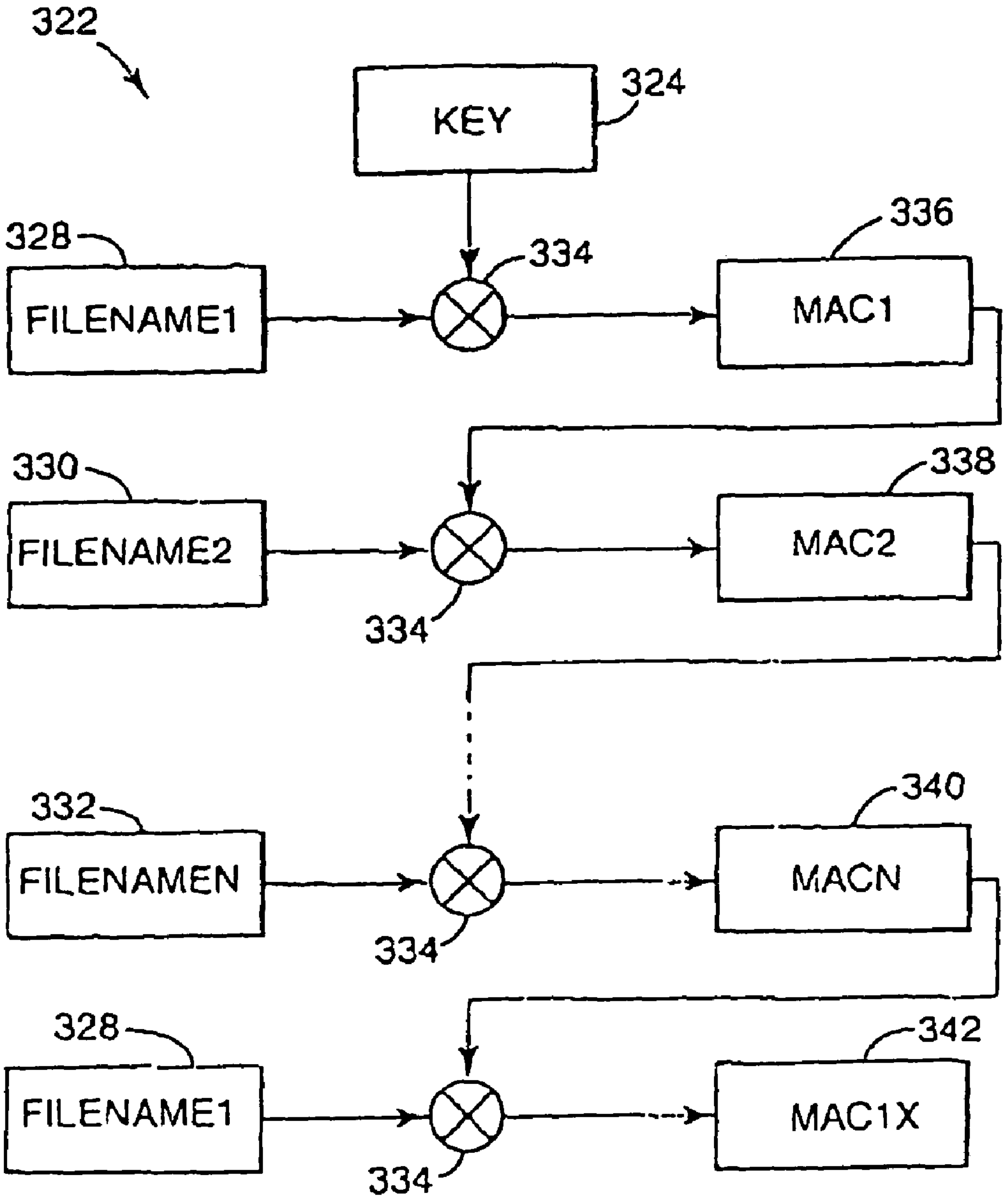
FIG. 8 is a diagram illustrating one exemplary embodiment of a message authentication code process used in a gaming system according to the present invention.

FIG. 8 is a diagram illustrating one exemplary embodiment of a message authentication code process 322 used in the present invention, including being used in preparing a game data set for authentication for a gaming system according to the present invention. In this embodiment, the message authentication code process utilizes a public-key encryption algorithms in a block chaining mode as a one-way hash function. Game data set 320 includes program filenames FILENAME1 328, FILENAME2 330 through FILENAMEN 332. A message authentication code is determined which is unique to each program file and filename FILENAME1 328, FILENAME2 330 through FILENAMEN 332. A message authentication code function 334 is defined for the message authentication code process 322. Program FILENAME1 328 and message authentication code key 324 are applied to the message authentication code function to determine message authentication code 336 (MAC1). Utilizing a block chaining scheme, the message authentication code MAC1 336 is used as the "key" for determining the next message authentication code unique to the next file. As such, the validity of the message authentication code process 322 is also dependent on the order in which the message authentication codes are determined, and the validity of the message authentication code output from each previous step.

Program FILENAME2 330 and the message authentication code MAC1 336 are applied to message authentication code function 334 to determine message authentication code MAC2 338. This process is continued for each subsequent program file. As such, program FILENAMEN 332 and the last determined message authentication code are applied to message authentication code function 334 to determine the message authentication code FILENAMEN 340.

For increased security, a message authentication code is again determined for the program file FILENAME1 utilizing the last determined message authentication code. FILENAME1 328 and message authentication code MACN 340 are applied to message authentication code function 334 to provide a message authentication code MAC1X or (MAC1' 342). In this embodiment, each message authentication code is unique to each program file, especially where it has been derived in combination with information previously derived from other files as that authentication code is then dependent upon a previously determined message authentication code. Determining the message authentication code using each filename is much faster than hashing entire program files in an authentication scheme requiring hashing, and the subsequent determination of digital signatures using an encryption scheme.

Figure 9:
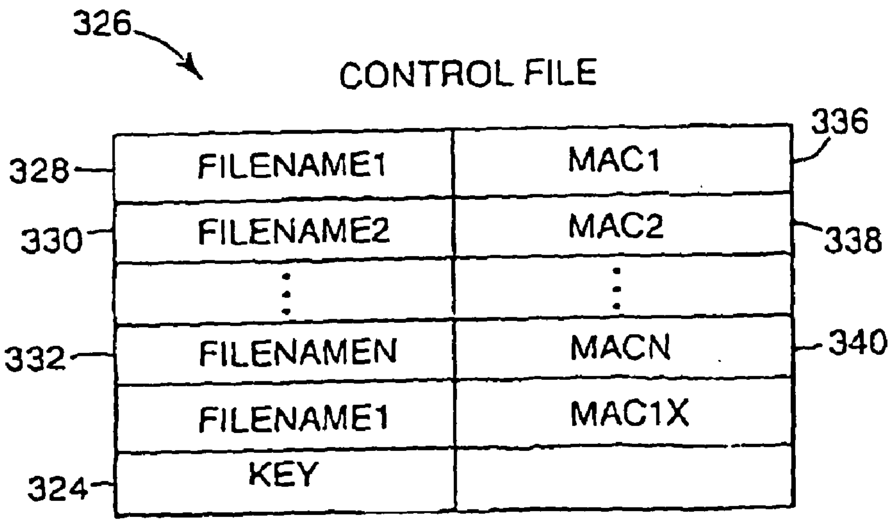
FIG. 9 is a diagram illustrating one exemplary embodiment of a control file used in a gaming system according to the present invention.

FIG. 9 is a diagram illustrating one exemplary embodiment of control file 326 generated after completion of the message authentication code process 322, where the encrypted control file is formed. Control file 326 includes each program filename in the game data set 320, including FILENAME1 328 (and the associated file 1), program FILENAME2 330 (and the associated file 2) through program FILENAMEN 332 (and the associated files through N). Control file 326 also includes the message authentication code key 324 attached to the encrypted control file 352, and the unique message authentication code unique to each program file as it has been treated within the encrypted compiled file or encrypted control file 326. In particular, message authentication code MAC1 unique to FILENAME1, also message authentication code MAC1X 336 which is unique to program FILENAME1 328, message authentication code MAC2 338 which is unique to program FILENAME2 330, through message authentication code MACN 340 which is unique to program FILENAMEN 332.

Figure 10:
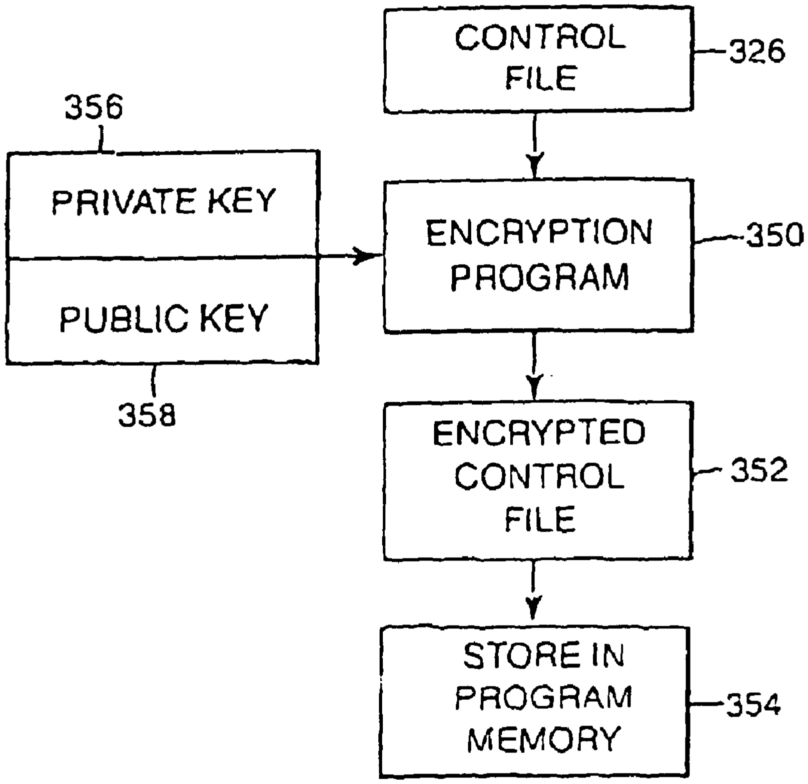
FIG. 10 is a diagram illustrating one exemplary embodiment of a process for encrypting a control file for use in a gaming system according to the present invention.

FIG. 10 is a block diagram illustrating one exemplary embodiment of a process for providing a secure gaming system according to the present invention. In one aspect, control file 326 is encrypted using encryption program 350, to provide an encrypted control file 352. The encrypted control file 352 is stored in program memory, indicated at 354. In reference also to FIG. 5, the encrypted control file is shown stored in nonvolatile memory 204 as control file 310 for use by gaming system 100. Additionally, the program files associated with the encrypted control file are also stored in memory 204.

In one aspect, encryption program 350 utilizes a private key 356 and a public key 358 as part of a public key/private key encryption process similar to the public key/private key encryption process previously described herein. One encryption process suitable for use as encryption program 350 in the present invention utilizes an El Gamal encryption scheme. Other encryption methods may be utilized which may or may not use public key/private key encryption systems, such as RSA and Diffie-Hellman, may be employed. Various hash functions may also be employed, such as MD5 or SHA. Preferably, the hash functions are one-way hash functions.

Figure 11:
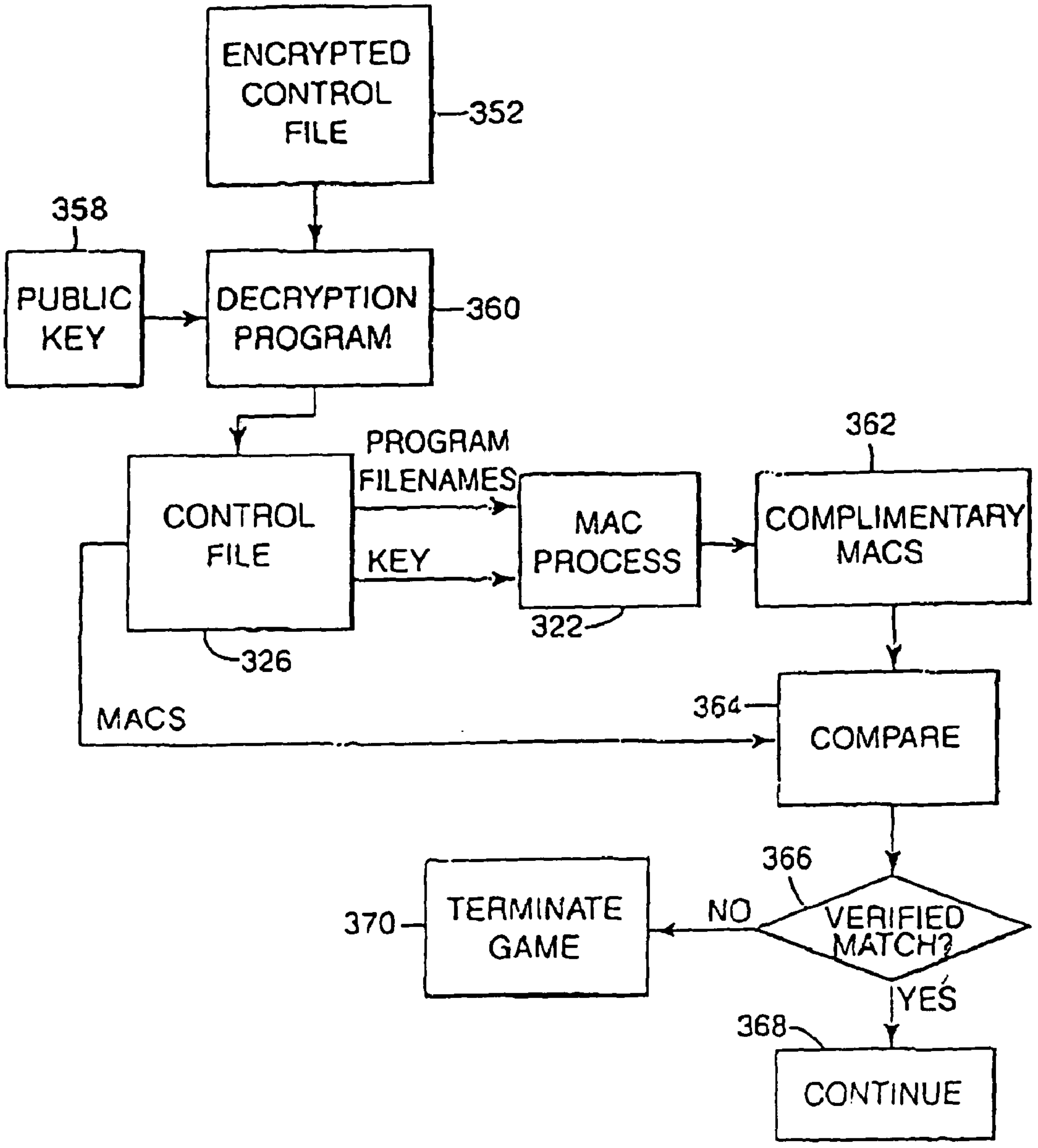
FIG. 11 is a diagram illustrating one exemplary embodiment of a process for authenticating a game used in a gaming system according to the present invention.

FIG. 11 is a diagram illustrating one exemplary embodiment of a method of authenticating a game used in a gaming system 100 according to the present invention. Reference is also made to FIGS. 1-10 previously detailed herein. The game can be verified as authentic at selected times (including regular or periodic times, to an extent that approaches continual authentication), such as when the machine is not in use, during game power-up, or when game data, including game program files, is transferred from nonvolatile memory 204 to RAM for use by the gaming system 100. Further, once transferred into RAM 203, the authentication of the game data set or game program files can be checked at (continuously or at desired intervals) during operation of the game to verify authentication of the game code and data.

In one aspect, encrypted control file 352 is received from nonvolatile memory 204 and decrypted using a corresponding decryption program 360. In one aspect, decryption program 360 utilizes public key 358. The decryption program 360 reverses the encryption provided by encryption program 350. The application of decryption program 360 to encrypted control file 352 results in the original control file 326. Control file 326 includes the filenames FILENAME 1, FILENAME 2 through FILENAMENControl file 326 further includes the corresponding unique message authentication codes MAC1, MAC2 through MACN, and MAC1X and message authentication code key 324.

The newly created MAC's are compared to previously stored MAC's to verify authenticity of the game and in particular the game programs.

The program filenames and message authentication code key are applied to the same message authentication code process 322, as previously detailed in FIG. 8, providing an output of complimentary message authentication codes 362. At 364, the message authentication codes from control file 326 are compared to the corresponding determined complimentary message authentication codes 362. As indicated at 366, if the message authentication codes and the complimentary message authentication codes set match, the game is verified authentic and use of the game programs is allowed to continue, indicated at 368. If the message authentication codes and the complimentary message authentication codes do not match, the game is not verified as authentic and enters an error mode, is terminated and/or system operating personnel are notified, indicated at 370.

Figure 12:
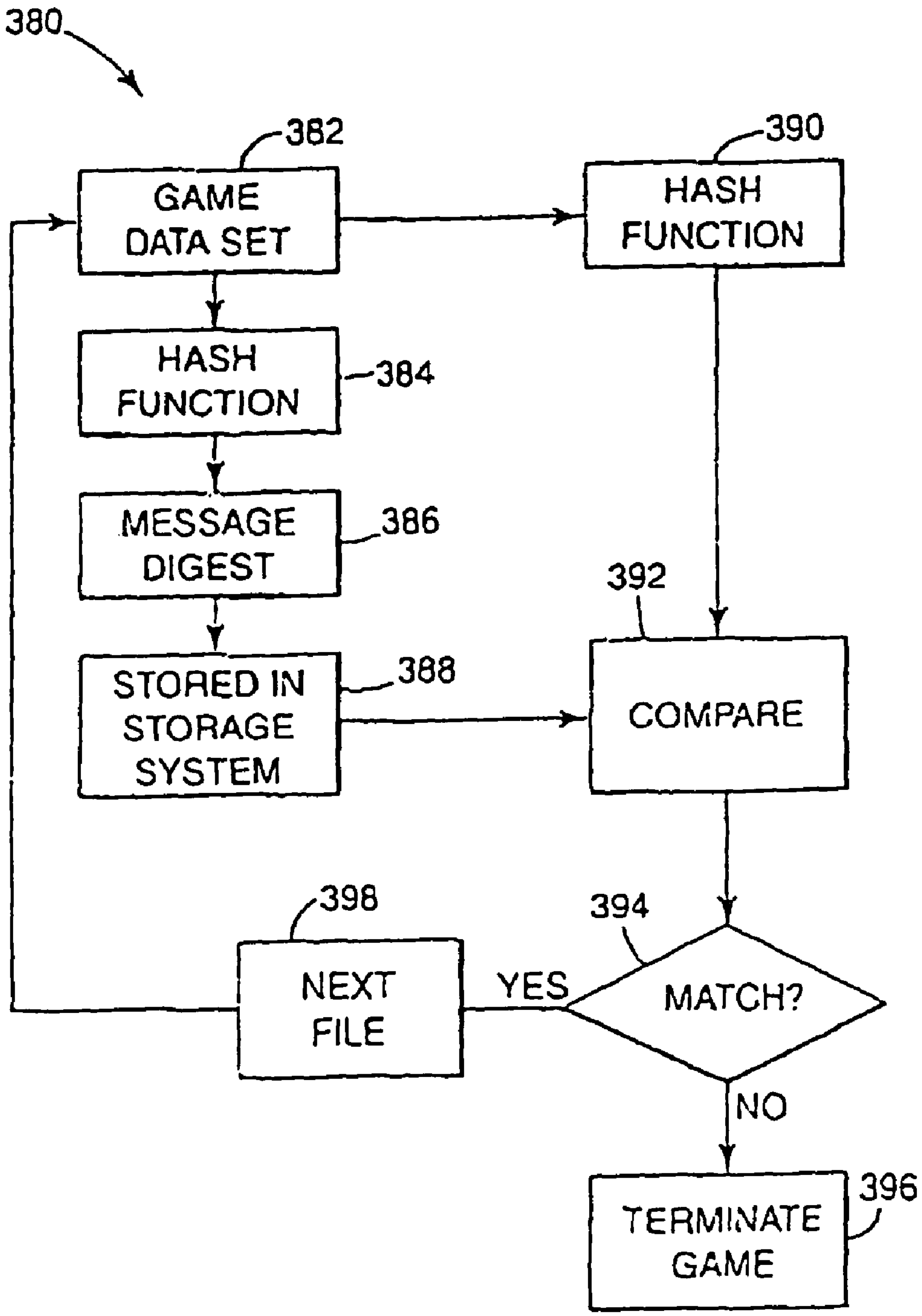
FIG. 12 is a diagram illustrating one exemplary embodiment of a process for verifying a game program in a gaming system according to the present invention.

In FIG. 12, one exemplary embodiment of a game verification process used in a gaming system according to the present invention is generally shown at 380. In verification process 380, after the game data set 382 has been authenticated and transferred into RAM 203, the present invention provides for continuous verification of the game data set to assure that the game data set 382 has not changed from the original game data set stored in nonvolatile memory 204. In particular, a hash function 384 is applied to the game data set 382, resulting in a hashed output stored in message digest 386. Message digest 386 comprises a unique hashed output corresponding to each program file in game data set 382. In one aspect, hash function 384 is a SHA hash function. Other suitable hash functions include MD5, SNEFRU, HAVAL and N-HASH. Other hash functions which are suitable for use in the verification process according to the present invention will become apparent to one skilled in the art after reading the present application. The hashed output or message digest 386 is stored in a storage system 388. The storage system 388 may include message digest 386 being stored in RAM 203 or in NVRAM 308 or other suitable storage system which is part of gaming system 100.

During operation of the gaming system, the gaming data set 382 may be continuously verified to determine that no change has occurred in the game data set. In one aspect, the game data set 382 is verified one file at a time. In particular, during operation of the gaming system, a program file is applied to hash function 390, wherein hash function 390 is the same as hash function 384. At 392, the hashed output of hash function 390 is compared to the corresponding hashed output stored at system 388. At 394, if no match occurs the game enters into an error mode, is terminated, and/or gaming personnel are notified, indicated at 396.

At 398, if a match occurs, the next program file of game data set 382 is verified in a similar manner. As such, the game data set 382 is continuously verified during operation of the gaming system. Another aspect, the game data set may be verified using the verification process according to the present invention at desired time intervals or upon the occurrence of a desired event, such as the start of each game played on the gaming system.

The gaming system 100 according to an aspect of the present invention provides a unique system and method for preparing a game data set for authentication and authenticating a game used in the gaming system 100. The gaming system 100 includes a process which securely verifies that the gaming set, (including program files), the operating system, including a Linux kernel and bios, as well as data files have not been altered, either intentionally or unintentionally, which could result in the changing of the outcome of a game played, or cause other malfunctions on the gaming system 100. In one aspect, the present invention provides for continuous verification of the gaming system 100 during operation of the gaming system 100. In another aspect, verification occurs at the request of a host computer or command from a local computer.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

Another aspect of the present invention includes a method of verifying game data that does not interfere with the performance of the gaming machine. The method comprises providing a host computer for running a casino-style game, providing at least one memory device for storing data for use on the host computer, and providing a separate form of intelligence and associated memory (if needed) for verifying data stored on the at least one memory device prior to loading into volatile memory of the host computer. In one form of the invention, the gaming program objects or game layer can be verified while the system is booting, preventing interference to the operation of the host computer system. The validation mechanism is in-circuit, meaning that the data is validated during operation of the host system. The in-circuit validation (hereinafter "ICV") can therefore be thought of as a gate, including intelligence and associated memory that functions to allow data to enter a host computer only after validation, to prevent the host computer or an external device from writing to the memory, and to provide continuous or periodic validation of data stored in memory to enable regulators to access and rapidly verify the system.

The above-described Kobetron™ Inc. and the Dataman™ Ltd. prior art differ from what is intended to be practiced in the present invention. Primarily, the present invention comprises an in-circuit verification mechanism positioned between the host computer and its memory device or devices (there can be more than one ICV) as opposed to a method that requires removing the media (e.g., the EPROM or other chip or memory element) and generating a signature in a separate piece of equipment. Those prior art validation systems actually take a memory element out of the machine to verify it. Those systems check the chip with another machine, which requires the primary gaming device or gaming machine to be shut down. The presently described validation system has two elements:

1) a "black box," the EAPTSD, is placed in between the storage media (e.g., Compact Flash, EPROM, CD ROM, etc.) and the host game computer/processor. To the host computer (and the storage media), the EAPTSD is invisible. The EAPTSD may have two purposes. It may be programmed and or otherwise configured to block attempts by the game computer or an external device or system to write to the storage media, and the EAPTSD responds to requests for verification from one or more internal or external devices;

2) an "external device" (such as a second device or second microprocessor), may comprise a hand-held or networked system, with direct access to a computer/microprocessor or connected by cable, wiring or RF communication, which sends validation requests to the black box. The request communication may be encrypted. These requests ask the black box to perform various authentication routines (for example, as described above and incorporated by reference) on the storage media and send the results back. Alternatively, the requests may ask the black box to return the contents of the storage media for validation by the external device. This communication can be sent over a physical wire such as rs232 or equivalent element.

A big advantage of this new approach is that the storage media can be validated while the machine is being booted up, while the machine is in operation, even during game play. If the game is in play, the external or wireless communication port is accessed, the storage media is accessed, and the game is verified without interference by the game computer. In the event that the game computer requires information from the storage media, the EAPTSD preferably pauses its communication with the storage media, allows communication to be completed between the game computer and the storage media, and then continues the verification process when that particular communication has halted. This pause in the communication between the second, external device, the EAPTSD and/or the storage media may occur as often as needed to ultimately complete the verification procedure. In contrast, the prior art requires several distinct and invasive steps to validate storage media that may include at least:

1) power off the machine
2) remove storage media
3) insert media in validator machine
4) perform signature on storage media, and
5) replace media and re-power machine.

The EAPTSD is invisible to both the game and gaming system. Because of this, the EAPTSD should be used on any gaming system that uses similar storage media, not just a proprietary gaming system. Kobetron™ Inc. validation systems or the DATAMAN S4 validation system are not integrated into the game or gaming system.

Neither Kobetron™ nor Dataman security systems send communication requests or receive responses from games or gaming systems. The storage media is physically removed from the machine when validation is performed. Additionally, each prior art security system tends to be limited to specific electronic fingerprints or signatures which are described as a "four character Kobetron MT2000 code" and or in Dataman as either an 8-character CRC type unique signature similar to Kobetron™ Inc. security system 2000 or a 40-character SHA/SHA-1 unique signature function identical to that used by the gaming board).

As noted above, neither the Kobetron™ Inc. or Dataman, Ltd, security systems validate by plugging into a communication port on the gaming device. The Dataman S4 does have an option to use communications to a host computer, but this is unrelated to any type of "live" validation. Aurora Casino Equipment uses a bridge that is inserted between a single EPROM chip and the processing intelligence. This bridge has a communication function that apparently broadcasts a signature to an RF receiver to verify hard memory on the EPROM chip. Each EPROM would require a separate broadcasting bridge to authenticate each EPROM. The published system also appears to authenticate upon boot up. It is important to note that the storage media of the present invention could be a plurality of PROM or EPROM chips and "live" validation would offer the advantage that the content of all chips could be validated in a single process step.

The term 'Lower level of validation' has been described as available for verification according to the practices of the invention. The validation is totally transparent to the storage media, the computer, etc. The black box or EAPTSD filters out data or other information or signals and has different functionality in authenticating/verifying the contents of the storage media and if the storage media is writeable, the processing intelligence or another processor will prevent the media from being written on. The practice of the present invention in one preferred embodiment validates content of storage media, such as compact flash, whatever its content. It is an additional layer of authentication over a watchdog function that is performed on the gaming computer according to the practice of certain above commonly assigned cited our co-pending Patent Applications. The practice of the present invention may validate generic compact flash rather than being specific to a single game element. This can be done by various procedures as described above or by a challenge response or hash value encryption.

One preferred form of validation is fully disclosed in co-pending application Ser. No. 10/134,663, filed Apr. 25, 2002 entitled Authentication in a Secure Computerized Gaming System, the content which is hereby incorporated by reference. This validation technique is particular suitable for the ICV of the prevent invention because in a preferred form of the invention, the separate processing intelligence and associated memory is of modest size and processing speed, keeping the device inexpensive. The technique depends exclusively on hashing algorithms, rather than encryption and signature generation techniques that require more resources.

As noted above, an externally accessible pass through security device, hereinafter referred to as an EAPTSD (e.g., with a microprocessor) is installed in connection with the gaming apparatus between the gaming computer and the storage media. For example, the EAPTSD may be communicatively between the gaming computer and the storage media, so that the gaming computer must pass data through the EAPTSD to communicate with the storage media. The physical location of the EAPTSD is not critical, and the EAPTSD may be inside the housing, on the door of the housing, outside the housing, insertable into a connecting port on the housing, or communicatively positioned at or with an external computer (e.g., a pit computer, central computer, or mainframe, etc.). A separate communicating port, unit, gate, logic, etc. may be internal in the machine, and at least an external connection to an outside intelligence device must be provided in the networked version of the system for communication purposes, unless the network is wireless. If located outside of the housing and associated with a separate computer, the EAPTSD may be communicatively positioned in or with the pit computer or host computer or other networking computer. In that manner, a single EAPTSD may be used for a host of gaming devices.

The invention may be summarized as including a gaming apparatus comprising a housing, a game computer, a storage media having at least some casino game information thereon, and an externally accessible pass through security device that can be accessed externally, the externally accessible pass through security device being capable of enabling verification of at least some casino game information. Alternatively, the invention may be described as a gaming apparatus comprising a housing, a game computer having memory, a storage media having at least some casino game information, and communicatively between the game computer and the storage media an externally accessible pass through security device that can be accessed externally, the externally accessible pass through security device being capable of enabling verification of casino game information. The gaming apparatus may have the game computer communicate with storage media through the externally accessible pass through security device and the EAPTSD preferably allows communication through an externally accessible communication port to or from the storage media while preventing external communication to the game computer. Also, the externally accessible pass through security device may prevent communication through the externally accessible communication port from writing on the storage media. The externally accessible pass through security device may allow communication to storage media with approval of the communication content. The externally accessible pass through security device also allows communication to storage media and prevents such communication from writing on the storage media. In another aspect, verification communication through the external addressable communication port to externally accessible pass through security device may allow verification communication to storage media with no contemporary verification communication from the game computer to the storage media. The gaming apparatus may be programmed so that extant verification communication between the externally accessible pass through security device and the storage media is essentially continuous, but pauses when game communication is initiated by the game computer to the storage media. In this mode, the gaming apparatus, when verification communication has been paused, continues or reinitiates when game communication ceases between the game computer to the storage media. In the gaming apparatus, a microprocessor may be externally connected to the externally accessible communication port, and verification of casino game information can then be performed on a microprocessor that is externally connected to the external addressable communication port. Alternatively, communication with the EAPTSD from outside of the gaming machine can be wireless, i.e., a radio frequency network.

In a second embodiment within the generic concept of the invention, the entire authentication system (excluding the processing intelligence or including the processing intelligence) is included within an internal housing component that is installed within the gaming housing and placed into communicative connection with the controller. The system components included within the internal housing component includes at least the validation hardware and/or software that blocks writing onto the storage medium. Preferably the associated memory, as well as a storage medium such as a flash disc is also located within the housing. This internal housing and its functional components may be communicatively connected to the controller or computer. In one example of the invention, the device is pinned to plug into the "c" or hard drive connection of a host computer. This referred to in the practice of the invention as a secure disk or Secure Disk™ (2002, Shuffle Master, Inc.) authentication system.

Figure 13:
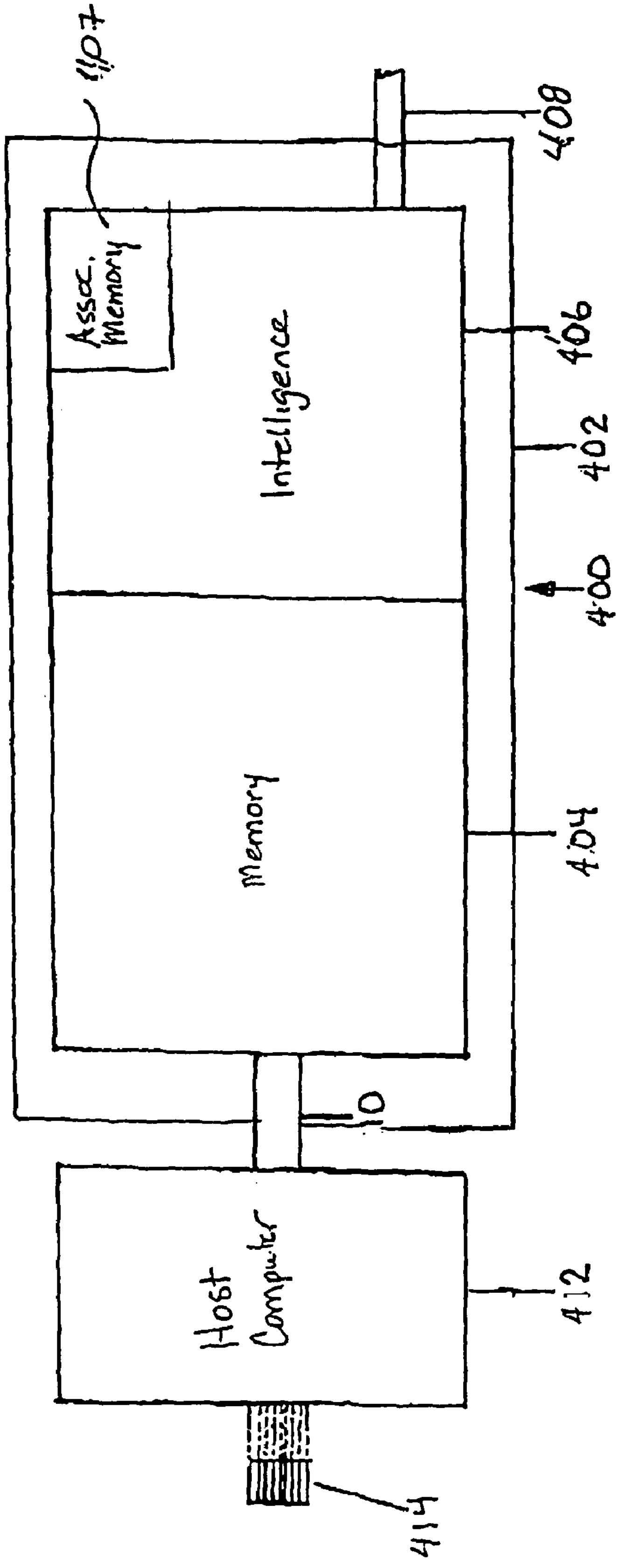
FIG. 13 shows a second generation intelligent chip validation (IVC) system that can be installed as a distinct unit within the gaming apparatus and communicatively connected to a controller or computer.

FIG. 13 shows a second generation intelligent chip validation (IVC) system 400 that can be installed as a distinct unit within the gaming apparatus and communicatively connected to a controller or computer 412. The system 400 is shown with a physical housing or box 402 that contains a storage memory 404 which may also be a writeable memory (e.g., compact flash, EPROM or multiple EPROMS), intelligence in the form of hardware 406 and/or software and memory 407 associated with the intelligence that contains the validation program and blocks writing to the storage memory 404 and transmits communication through port 408 to either an external device capable of requesting verification of data or to other game function or peripherals (not shown). The storage memory 404 may have game data such as gaming program shared objects as described in co-pending application serial number 09/520,405 and previously incorporated by reference. The storage memory 404 has a communication line 410 to a host controller 412 which may have an additional communication link 414 to other systems in the gaming apparatus, such as peripheral devices (not shown). Any authentication program may be included within the hardware and/or software, including without limit the programs described in U.S. Pat. Nos. 5,643,086; 6,106,396; and 6,149,522; and U.S. patent applications Ser. Nos. 09/520,404 (filed Mar. 8, 2000 and issued as U.S. Pat. No. 7,043,641 on May 9, 2006), 10/182,534 (filed Jul. 26, 2002 and issued as U.S. Pat. No. 7,203,841 on Apr 10, 2007), 09/949,021 (filed Sep. 7, 2001 and issued as U.S. Pat. No. 7,116,782 on Oct. 3, 2006), 10/134,657 (filed Apr. 25, 2002); and 10/134,663 (filed Apr. 25, 2002 and issued as U.S. Pat. No. 6,962,530 on Nov. 8, 2005), which are incorporated herein by reference for the disclosure of both programs, software and hardware enabling authentication programs. The entire housing 400 may be inserted into the gaming apparatus, for example, connected to a motherboard or walls within the apparatus. The authentication system is preferably essentially continuous. The program authenticates data in the storage memory 404 and when the authentication is finished, the authentication process begins again. In this manner, it is not necessary to initiate an authentication program to prove the system, and no particular event must occur to initiate authentication. When the system is powered up, the first authentication cycle begins, and then continues essentially continuously while the system is on. The system may be programmed for minor gaps between authentication cycles without deviating from the spirit of practice of the invention, however.

In a third embodiment within the generic practice of the invention, a Read Only Memory board that acts as a hard drive (without a hard drive) is operably connected to a processing intelligence with associated memory (which may be a hard drive or other processor or microprocessor, and may exclude an actual hard drive as long as the processing or controlling function is provided, such as by a programmable memory chip). This form of system is referred to as an Integrated Device Electronics system or IDE system.

Figure 14:
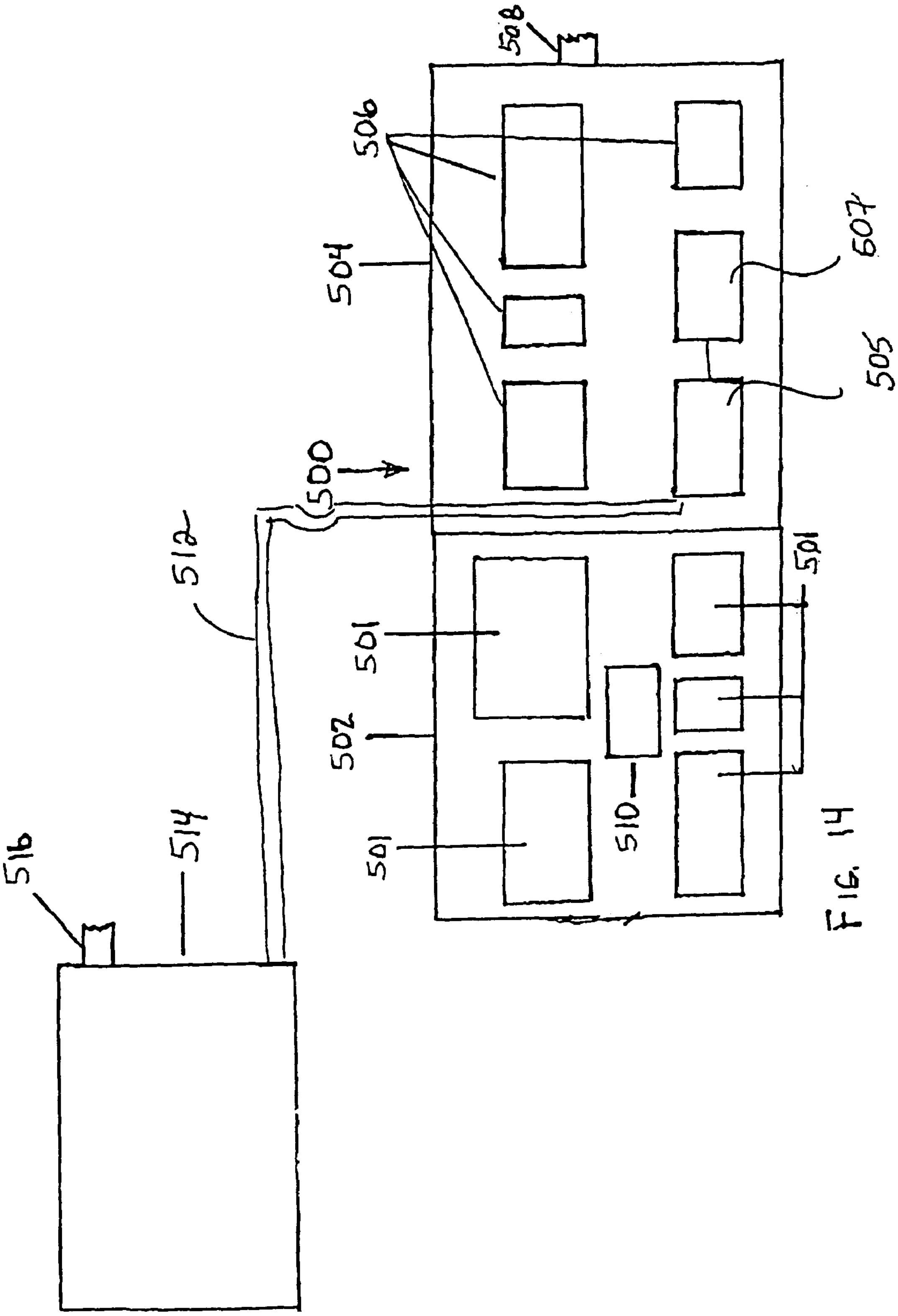
FIG. 14 shows a third generation IVC system having the authentication program embedded outside of the controller or computer.

FIG. 14 shows a third generation IVC system 500 having the authentication program embedded outside of the game controller or computer. This is referred to as the IDE system or the Integrated Device Electronics system. The IDE system 500 comprises a first board 502 having various memory storage elements 501 (e.g., preferably non-writeable media such as ROM, EPROM, PROM and the like)

Another board 504 which may be an extension or part of the first board 501 has its own processing intelligence. In one example of the invention, the intelligence is a hard-wired circuit 505. In another example, it is a processor, and software. The second board 504 may also include memory 507 associated with the processing intelligence. In some forms of the invention, additional memory storage elements 506 are also present on the board 504. The processing intelligence is capable of authenticating data stored in memory elements 501 and 506, if present.

A communication port 508 (I/O port with any communication link) carries information to and from the memory storage on the first and/or second board. Another communication link 512 to a host processor 514 with its own communication link 516 is shown in communicative connection with the second board 504 including intelligence 505 and associated memory elements 507.

The invention may be alternatively described as a method of verifying casino gaming data in a computer-based gaming apparatus comprising connecting a computer communication device to a casino gaming apparatus either directly through a port, or indirectly using wireless communication, so that the computer communication device is in communication with a security device inside of the gaming apparatus that is distinct from a game computer and storage media in the gaming apparatus, and the computer communication device verifies casino gaming data stored on the storage media. Again, in a preferred method, while the computer communication device is in communication with storage media and the gaming computer communicates with storage media, communication between the computer communication device and the storage media preferably pauses or ceases, and when communication between the gaming computer and the storage media ceases, communication between the computer communication device and the storage media may begin or continue (Alternately, communication between the host computer and memory, and the communication device and memory is continuous). In that method, the computer communication device may be in communication with a security device inside of the gaming apparatus that is distinct from a game computer and storage media in the gaming apparatus and the security device may be in communication with the storage media. Alternatively, the computer communication device is in communication with the security device inside of the gaming apparatus (that is distinct from a game computer and storage media in the gaming apparatus) and the security device is in communication with the storage media and the security device is not in communication with the gaming computer and the computer communication device is in communication with a security device inside of the gaming apparatus while the gaming apparatus is powered up. For example, the computer communication device is in communication with a security device inside of the gaming apparatus while the gaming apparatus is executing a casino game.

The invention may also be alternatively described as a method of verifying casino gaming data in a computer-based gaming apparatus comprising connecting a computer communication device to an external communication port on a casino gaming apparatus or by means of wireless communication so that the computer communication device is in communication with a security device inside of the gaming apparatus that is distinct from a game computer and storage media in the gaming apparatus, and the security device verifies casino gaming data in storage media. This method may operate when the security device communicates verification of casino gaming data to the computer communication device, and while the computer communication device is exchanging verification information with the security device storage media and the gaming computer communicates with storage media, communication between the computer communication device and the storage media pauses or ceases.

The practice of the secure internal systems of the invention enable greater flexibility in the exercise of management (e.g., central controller such as a casino or internet or wireless controller) control or direction of gaming equipment. A difficult and expensive component of the use of gaming equipment has been based on the need to send personnel to each playing game, apparatus or table on the floor to first shut down the machine and then second, gather information or otherwise alter the device. This is often done with two persons present to assure security. This is a high labor component of electronic game usage and reduces profits from the systems. The present security system can be modified to assist in reducing these costs by enabling a secure external download of information from memory while the gaming machine is in service. It is critical that this information be from a trustworthy source, which can be verified or screened by many techniques used in conjunction with the practice of the invention.

For example, after verification of casino game data or data sets in memory storage elements of the ICV, Secure Disk™ or IDE verification systems of the invention, information may then be downloaded from a secure external source into writeable memory (e.g., compact flash) in the verification systems or connected to the verification systems of the casino game apparatus. The external source of information must be confirmed as a valid or authorized source of information (e.g., password, source identification, source verification, personal user codes, automated verification through interrogation, or other screening or verification means), and, the external source may be allowed to write to writeable memory in the gaming apparatus. For example, a casino may have a bank of video games or video reel games that can have their game content modified. Game content would possibly include at least some of game rules, pay tables, symbol images, sound content, symbol probability, payout rates, ancillary image display, coin validation programs, currency validation programs, player information record systems, and other peripheral controls. To change game content, the secure and validated information source may be enabled to download to and write to memory on individual gaming apparatus or banks of gaming apparatus. This download is directed through the processing intelligence into memory and not the host gaming computer itself, which is a more secure form of download because the processing intelligence in the SecureDisk device has nothing to do with game play functions.

After downloading of this information, the memory may be and is again verified according to the existing authentication program. It may or may not be necessary to modify data in the associated memory of the processing intelligence to accomplish data verification. Although it is possible to download a different authentication program (e.g., using hash values, signatures, encryption, de-encryption, zero knowledge proofs, El Gamal algorithm signature verification, and other known validation systems and algorithms), it is preferred to have the verification/authentication program on a non-writeable element, or at least an element that is write protected or read only memory within the SecureDisk.

It is anticipated that as technology improves and as others engineer systems according to the practice of the invention that many variations and improvements and alternatives within the scope of the invention are expected. The above processes and apparatus may be implemented using different formats of software, different hardware, different information storage components and the like. Those changes and alterations are expected within the scope of the invention and the specific software, hardware and components are intended to be exemplary rather than absolutely limiting.

The invention claimed is:

1. A gaming apparatus, comprising:
a housing;
a game computer;
a storage media having at least some casino game information;
an externally accessible port; and
an externally accessible pass through security device configured to be accessed through the external accessible port, wherein the externally accessible pass through security device is further configured to;
enable verification of the casino game information;
determine whether the game computer requires communication with the storage media; and
pause or cease communication between the externally accessible pass through security device and the storage media, including the verification of the casino game information stored on the storage media upon determining that the game computer requires communication with the storage media.

2. The gaming apparatus of claim 1, wherein the externally accessible pass through security device is configured to continue or reinstate the verification communication that has been paused when communication ceases between the game computer and the storage media.

3. The gaming apparatus of claim 1, wherein a microprocessor is externally connected to the externally accessible communication port, and verification of casino game information is performed on the microprocessor.

4. A gaming apparatus, comprising:
a housing;
a game computer having memory;
a storage media having at least some casino game information;
an externally accessible communication port; and
an externally accessible pass through security device communicatively coupled between the game computer and the storage media, wherein the externally accessible pass through security device is configured to be accessed through the externally accessible port, and wherein the externally accessible pass through security device is configured to:
enable verification of the casino game information;
determine whether the game computer requires communication with the storage media; and
pause or cease communication between the externally accessible pass through security device and the storage media, including the verification of the casino game information stored on the storage media upon determining that the game computer requires communication with the storage media.

5. The gaming apparatus of claim 4, wherein the game computer is configured to communicate with the storage media through the externally accessible pass through security device and the externally accessible pass through security device is configured to enable communication through the externally accessible communication port to or from the storage media while preventing external communication to the game computer.

6. The gaming apparatus of claim 5, wherein the externally accessible pass through security device is configured to prevent communication through the externally accessible communication port that includes a command to write on the storage media.

7. The gaming apparatus of claim 6, wherein a microprocessor is externally connected to the externally accessible communication port, and verification of casino game information is performed on the microprocessor.

8. The gaming apparatus of claim 4, wherein the externally accessible pass through security is configured to approve content of the communication and to enable communication with the storage media based on the approval.

9. The gaming apparatus of claim 1, wherein the externally accessible pass through security is configured to enable communication with the storage media and to prevent such communication from writing on the storage media.

10. The gaming apparatus of claim 1, wherein the externally accessible communication port is configured to communicate a verification communication to the externally accessible pass through security device with no contemporary verification communication from the game computer to the storage media.

11. A method of verifying casino gaming data in a computer-based gaming apparatus, comprising:

authenticating, by a computer communication device, casino gaming data stored on an information storage media, wherein the computer communication device is in communication with a security device, the computer communication device is connected to an external communication port on a casino gaming apparatus, and the security device is distinct from a game computer and the information storage media in the casino gaming apparatus;

determining whether the game computer requires communication with the information storage media; and pausing or ceasing communication between the computer communication device and the information storage media upon determining that the game computer requires communication with the information storage media.

12. The method of claim 11, further comprising continuously authenticating, by the security device, the casino gaming data in the information storage media.

13. The method of claim 11, further comprising beginning or continuing the communication between the computer communication device and the information storage media when the communication between the gaming computer and the storage media ceases.

14. The method of claim 11, wherein the security device is in communication with the information storage media.

15. The method of claim 11, wherein the security device is not in communication with the gaming computer.

16. The method of claim 11, wherein the computer communication device is in communication with the security device inside of the gaming apparatus while the gaming apparatus is powered up.

17. The method of claim 11, wherein the computer communication device is in communication with the security device inside of the gaming apparatus while the gaming apparatus is executing a casino game.

18. The method of claim 11, further comprising authenticating, by a processing intelligence, the casino game data in the information storage media after an external source downloads information through the processing intelligence to the information storage media.

19. The method of claim 18, wherein the external source comprises a casino controlled source of information.

20. A method of verifying casino gaming data in a computer-based gaming apparatus comprising:

verifying, by a security device, casino gaming data in storage media, wherein the security device is in communication with a computer communication device, the computer communication device is connected to an external communication port on a casino gaming apparatus, the security device is distinct from a game computer and the storage media in the casino gaming apparatus;

determining, by the security device, whether the game computer requires communication with the storage media;

pausing or ceasing, by the security device, communication between the security device and the storage media upon determining that the game computer requires communication with the storage media.

21. The method of claim 20, further comprising communicating, by the security device, verification of the casino gaming data to the computer communication device.

22. The method of claim 20, wherein the computer communication device is in communication with the security device and the security device is in communication with the storage media and the security device is not in communication with the gaming computer.

23. The method of claim 20, wherein the computer communication device is in communication with the security device inside of the casino gaming apparatus while the casino gaming apparatus is powered up.

24. The method of claim 20, wherein the computer communication device is in communication with the security device inside of the gaming apparatus while the casino gaming apparatus is executing a casino game.

25. A method of authenticating data within a gaming machine during operation, comprising:

providing a gaming machine with a host computer, a security device comprising separate intelligence and associated memory, and at least one storage media for storing gaming data;

while the gaming machine is in operation, verifying the gaming data in the storage media by executing a verification program on the separate intelligence;

determining, by the security device, whether the host computer requires to communication with the storage media;

pausing or ceasing, by the security device, communication between the security device and the storage media upon determining that the game computer requires communication with the storage media.

26. The method of claim 25, wherein the verification method used to verify the gaming data in the storage media is zero knowledge proofs.

27. The method of claim 26, wherein host computer functions are not altered by execution of the verification program, unless the gaming data cannot be verified.

* * * * *